United States Patent
Wu et al.

(10) Patent No.: US 9,462,220 B2
(45) Date of Patent: Oct. 4, 2016

(54) AUTO-REGRESSIVE EDGE-DIRECTED INTERPOLATION WITH BACKWARD PROJECTION CONSTRAINT

(75) Inventors: Yongjun Wu, Bellevue, WA (US); Wenfeng Gao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 854 days.

(21) Appl. No.: 12/972,288

(22) Filed: Dec. 17, 2010

(65) Prior Publication Data

US 2012/0155550 A1    Jun. 21, 2012

(51) Int. Cl.
| | |
|---|---|
| *H04N 7/26* | (2006.01) |
| *G06K 9/32* | (2006.01) |
| *H04N 7/01* | (2006.01) |
| *H04N 19/80* | (2014.01) |
| *H04N 19/176* | (2014.01) |
| *H04N 19/117* | (2014.01) |
| *H04N 19/14* | (2014.01) |
| *H04N 19/59* | (2014.01) |

(52) U.S. Cl.
CPC .......... *H04N 7/0142* (2013.01); *H04N 19/117* (2014.11); *H04N 19/14* (2014.11); *H04N 19/176* (2014.11); *H04N 19/59* (2014.11); *H04N 19/80* (2014.11)

(58) Field of Classification Search
CPC ................. H04N 19/0009; H04N 19/00151; H04N 19/00218; H04N 19/00696; H04N 19/00369; H04N 19/00903; H04N 19/00533; H04N 19/00569; H04N 7/26058; H04N 19/80
USPC .......... 345/581; 348/616; 375/240.1, 240.12, 375/240.25; 382/226, 261
See application file for complete search history.

(56) References Cited

U.S. PATENT DOCUMENTS

| | | | |
|---|---|---|---|
| 2002/0109787 A1* | 8/2002 | Moni et al. .................. | 348/616 |
| 2002/0122596 A1* | 9/2002 | Bradshaw ..................... | 382/226 |
| 2004/0252759 A1 | 12/2004 | Winder et al. | |
| 2005/0135700 A1* | 6/2005 | Anderson ..................... | 382/261 |

(Continued)

OTHER PUBLICATIONS

Dai et al., "Bilateral Back-Projection for Single Image Super Resolution," *Proc. Int. Conf. on Multimedia and Expo*, pp. 1039-1042, Jul. 2007.

(Continued)

*Primary Examiner* — Young Lee
(74) *Attorney, Agent, or Firm* — Sunah Lee; Dan Choi; Micky Minhas

(57) ABSTRACT

Techniques and tools for interpolation of image/video content are described. For example, a tool such as a display processing module in a computing device receives pixel values of a low-resolution picture and determines an interpolated pixel value between a set of the pixel values from the low-resolution picture. The tool uses auto-regressive edge-directed interpolation that incorporates a backward projection constraint (AR-EDIBC). As part of the AR-EDIBC, the tool can compute auto-regressive (AR) coefficients then apply the AR coefficients to the set of pixel values to determine the interpolated pixel value. For the backward projection constraint, the tool accounts for effects of projecting interpolated pixel values back to the pixel values of the low-resolution picture. The tool stores the interpolated pixel values and pixel values from the low-resolution picture as part of a high-resolution picture. The tool can adaptively use AR-EDIBC depending on content and other factors.

23 Claims, 13 Drawing Sheets

(56) References Cited

U.S. PATENT DOCUMENTS

| | | | |
|---|---|---|---|
| 2007/0025438 A1* | 2/2007 | Bruls | 375/240.1 |
| 2007/0025447 A1* | 2/2007 | Kojokaro et al. | 375/240.24 |
| 2007/0160153 A1 | 7/2007 | Sullivan | |
| 2008/0231746 A1 | 9/2008 | Lertrattanapanich | |
| 2008/0231748 A1 | 9/2008 | Su | |
| 2008/0267443 A1* | 10/2008 | Aarabi | 382/100 |
| 2009/0316984 A1 | 12/2009 | Lee | |
| 2010/0027686 A1* | 2/2010 | Zuo et al. | 375/240.29 |
| 2010/0150229 A1* | 6/2010 | Francois et al. | 375/240.12 |
| 2010/0245372 A1* | 9/2010 | Gedik et al. | 345/581 |

OTHER PUBLICATIONS

Dong et al., "Nonlocal Back-Projection for Adaptive Image Enlargement," 2009 16$^{th}$ IEEE International Conference on Image Processing, Cairo, Egypt, pp. 349-352, Nov. 7-10, 2009.

Dong et al., "Super-resolution with Nonlocal Regularized Sparse Representation," <http://vcip2010.ustc.edu.cn/BPC/Special/Super-resolution%20with%20Nonlocal%20Regularized%20-Sparse%20Representation.pdf>, 10 pages, Published Jul. 2010.

Irani et al., "Motion Analysis for Image Enhancement: Resolution, Occlusion, and Transparency," *JVCIP*, 24 pages, 1993.

Li et al., "New Edge-Directed Interpolation," *IEEE Trans. Image Process.*, vol. 10, No. 10, pp. 1521-1527, Oct. 2001.

Wu et al., "Low Bit-Rate Image Compression via Adaptive Down-Sampling and Constrained Least Squares Upconversion," *IEEE Trans. Image Process.*, vol. 18, Issue 3, pp. 552-561, Mar. 2009.

Zhang et al., "Image Interpolation by Adaptive 2-D Autoregressive Modeling and Soft-Decision Estimation," *IEEE Trans. Image Process.*, vol. 17, Issue 6, pp. 887-896, Jun. 2008.

Zhang et al., "A Motion-Aligned Auto-Regressive Model for Frame Rate Up Conversion," *IEEE Trans. Image Process.*, vol. 19, Issue 5, pp. 1248-1258, Apr. 15, 2010.

YUVsoft, "YUV Super Resolution Technology," <http://www.yuvsoft.com/pdf/Super_Resolution.pdf>, 1 pages, downloaded Dec. 15, 2010.

YUV soft, "YUV Super Resolution Technology," <http://www.yuvsoft.com/technologies/super_resolution/index.html>, 2 pages, downloaded Dec. 15, 2010.

Intel, "Personal Multimedia Enhancement & Management, Robust Video Super-resolution," <ftp://download.intel.com/pressroom/kits/research/poster_Robust_Video_super-resolution.pdf>, 1 page, downloaded Dec. 15, 2010.

Intel, "Neuron Games' Super Cortex: Dynamic Screen Resizing," http://software.intel.com/en-us/blogs/2010/05/26/neuron-games-super-cortex-dynamic-screen-resizing>, 4 pages, downloaded Dec. 15, 2010.

MotionDSP, "The Enhancement Technology Powering Ikena," http://www.motiondsp.com/ikena-technology/, 2 pages, downloaded Dec. 15, 2010.

Office Action and Search Report dated Jan. 3, 2014, from Chinese Patent Application No. 201110426177.4, 10 pp.

Notification to Grant dated Aug. 6, 2014, from Chinese Patent Application No. 201110426177.4, 3 pp.

* cited by examiner

FIG. 7D

$$\vec{X} = \begin{bmatrix} X1 \\ X2 \\ X3 \\ X4 \\ X5 \\ X6 \\ X7 \\ X8 \\ X9 \\ X10 \\ X11 \\ X12 \\ X13 \\ X14 \\ X15 \\ X16 \\ X17 \\ X18 \\ X19 \\ X20 \\ X21 \end{bmatrix} = \begin{bmatrix} 206 \\ 135 \\ 203 \\ 202 \\ 189 \\ 197 \\ 102 \\ 197 \\ 195 \\ 201 \\ 193 \\ 199 \\ 115 \\ 90 \\ 109 \\ 148 \\ 138 \\ 131 \\ 210 \\ 195 \\ 206 \end{bmatrix}$$

$$C = \begin{bmatrix} 193 & 115 & 202 & 135 \\ 206 & 90 & 189 & 148 \\ 197 & 102 & 195 & 197 \\ 201 & 206 & 195 & 189 \\ 202 & 135 & 210 & 138 \\ 201 & 199 & 206 & 203 \\ 199 & 144 & 203 & 109 \\ 203 & 109 & 131 & 96 \\ 206 & 203 & 206 & 131 \\ 210 & 193 & 203 & 202 \\ 183 & 204 & 201 & 206 \\ 208 & 191 & 197 & 102 \\ 204 & 117 & 206 & 90 \\ 115 & 107 & 135 & 92 \\ 102 & 111 & 197 & 90 \\ 135 & 92 & 138 & 107 \\ 189 & 148 & 166 & 107 \\ 195 & 197 & 212 & 88 \\ 195 & 189 & 193 & 166 \\ 203 & 202 & 214 & 210 \\ 220 & 197 & 218 & 195 \end{bmatrix}$$

$$D = \begin{bmatrix} 199 & 102 & 203 & 197 \\ 102 & 109 & 197 & 203 \\ 206 & 135 & 189 & 202 \\ 197 & 203 & 195 & 206 \\ 203 & 197 & 131 & 195 \\ 193 & 206 & 202 & 201 \\ 115 & 90 & 135 & 206 \\ 135 & 148 & 138 & 189 \\ 202 & 189 & 210 & 195 \\ 201 & 197 & 206 & 220 \\ 208 & 199 & 197 & 201 \\ 204 & 115 & 206 & 193 \\ 191 & 144 & 102 & 199 \\ 144 & 111 & 109 & 102 \\ 90 & 92 & 148 & 135 \\ 109 & 90 & 96 & 197 \\ 197 & 96 & 88 & 131 \\ 189 & 138 & 166 & 210 \\ 195 & 131 & 212 & 206 \\ 206 & 195 & 206 & 218 \\ 201 & 202 & 195 & 203 \end{bmatrix}$$

MATRIX F COLUMNS 1 - 11

| | | | | | | | | | | |
|---|---|---|---|---|---|---|---|---|---|---|
| 0.1335 | 0 | 0.4588 | -0.1809 | 0 | 0.6202 | 0 | 0 | 0 | 0 | 0 |
| 0.6202 | 0.4588 | -0.1809 | 0 | 0 | 0 | 0.1335 | 0 | 0 | 0 | 0 |
| 0 | 0.1335 | 0.6202 | 0 | -0.1809 | 0 | 0 | 0.4588 | 0 | 0 | 0 |
| 0 | 0 | 0.1335 | 0.6202 | 0.4588 | 0 | 0 | 0 | -0.1809 | 0 | 0 |
| 0 | 0 | 0 | 0.1335 | 0 | 0 | 0 | 0 | 0.4588 | 0 | 0 |
| 0 | 0 | 0 | 0.4588 | 0 | 0.1335 | 0 | 0 | 0 | 0.6202 | 0 |
| 0.4588 | 0 | 0 | 0 | 0 | -0.1809 | 0 | 0 | 0 | 0 | 0.6202 |
| -0.1809 | 0 | 0 | 0 | 0 | 0 | 0.4588 | 0 | 0 | 0 | 0 |
| 0 | -0.1809 | 0 | 0 | 0 | 0 | 0.6202 | 0 | 0 | 0 | 0 |
| 0 | 0.6202 | 0 | 0 | 0 | 0 | 0 | -0.1809 | 0 | 0 | 0 |
| 0 | 0 | 0 | 0 | 0.6202 | 0 | 0 | 0.1335 | 0 | 0 | 0 |
| 0 | 0 | 0 | 0 | 0.1335 | 0 | 0 | 0 | 0.6202 | 0 | 0 |
| 1.0000 | 0 | 0 | 0 | 0 | 0 | 0 | 0 | 0 | 0 | 0 |
| 0 | 1.0000 | 0 | 0 | 0 | 0 | 0 | 0 | 0 | 0 | 0 |
| 0 | 0 | 1.0000 | 0 | 0 | 0 | 0 | 0 | 0 | 0 | 0 |
| 0 | 0 | 0 | 1.0000 | 0 | 0 | 0 | 0 | 0 | 0 | 0 |
| 0 | 0 | 0 | 0 | 1.0000 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

MATRIX F COLUMNS 12 - 21

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | -0.1809 | 0.6202 |
| 0 | 0 | 0 | 0 | 0 | 0 | 0 | 0 | 0 | -0.1809 |
| 0.1335 | 0 | 0 | 0 | 0 | 0 | 0 | 0 | 0 | 0 |
| 0.6202 | 0.1335 | 0 | 0 | 0 | 0 | 0 | 0 | 0 | 0 |
| 0 | 0 | 0.1335 | 0.4588 | 0 | 0 | 0 | 0 | 0 | 0 |
| 0 | 0 | 0 | 0.1335 | 0.4588 | 0 | 0 | 0 | 0 | 0 |
| 0 | 0 | 0 | 0 | 0 | 0.4588 | -0.1809 | 0 | 0 | 0 |
| 0 | 0 | 0 | 0 | 0 | 0 | 0.4588 | -0.1809 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

AUTO-REGRESSIVE EDGE-DIRECTED INTERPOLATION WITH BACKWARD PROJECTION CONSTRAINT

BACKGROUND

Due to network bandwidth limitations and limitations on server storage space, much of the image/video available on the World Wide Web and other networks exists in low-quality versions degraded from the original image/video. The most common degradations are down-sampling and compression. Down-sampling reduces spatial resolution, for example, converting 640×480 images to 320×240 images by eliminating pixel values in the images. Generally, compression selectively removes less important details and more efficiently represents redundant parts of the image/video. Down-sampling and compression can greatly lower the required bandwidth and storage space for image/video, making accessibility of the image/video practical and convenient. But those benefits are obtained at the expense of the perceptual experience of users, as degradation typically leads to noticeable quality loss in the form of defects in the resulting image/video, such as blurring, blocking and ringing.

For playback of digital image/video content, high-resolution displays have become more common for personal computers, televisions, and even mobile computing devices. On a high-resolution display, down-sampled, compressed image/video content can be reconstructed and shown in a small area that matches the down-sampled resolution. Often, however, the reconstructed image/video is up-sampled for presentation in a larger area of the high-resolution display. Unfortunately, when the size of the image/video is increased for presentation on a high-resolution display, defects introduced by down-sampling and compression may become more noticeable.

To understand why this is the case, it helps to understand how video and image information is represented and processed in a computer. A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample or pixel value. For a color image, it is conventional to use more than one sample to represent the color of each elemental region, and typically three samples are used. The set of these samples for an elemental region may be referred to as a pixel, where the word "pixel" is a contraction of "picture element." For example, one pixel may be comprised of three pixel values that represent the intensity of red, green and blue light needed to represent the elemental region.

When image/video is up-sampled, new pixel values are created by interpolating between existing pixel values. There are various linear up-sampling techniques for image and video interpolation, such as nearest neighbor, bi-linear, bi-cubic, Lanczos and Sinc interpolation. Bi-linear interpolation, which essentially involves averaging of pixel values to find a new, intermediate pixel value, is computationally simple but tends to result in blurring. Other forms of interpolation, such as bi-cubic interpolation, are more computationally complex and preserve more edge details, but also tend to introduce visible artifacts. In part, this is because bi-linear and bi-cubic interpolation schemes typically make the simplifying assumption that image/video content is spatially invariant (i.e., does not change in nature within the image/video content), so the weights applied during interpolation are pre-defined for any areas in images. Such interpolation fails to account for fast-changing characteristics and local characteristics of textures, edges and object contours within image/video content, which often results in interpolated, higher resolution images that have blurred or thicker texture, edges and object contours.

Some other forms of interpolation adapt the weights applied during interpolation depending on the local content of the image/video being filtered. Previous forms of interpolation, however, fail to yield reliable weights to be applied during interpolation for certain types of image/video content, which can result in visible distortion in areas of texture, edges and object contours.

SUMMARY

In summary, the Detailed Description presents techniques and tools for adaptive interpolation that provides visually pleasing results even within areas of texture, edges and object contours in many scenarios. The interpolation can use forward prediction of filtering coefficients to adapt to changing local characteristics of image/video content, while also considering a backward projection constraint that makes the filtering coefficients more reliable and robust to mis-prediction.

According to one aspect of the techniques and tools described herein, a tool such as a post-processing module, display processing module or other module in a computing device performs a method of pixel value interpolation. The tool receives pixel values of a picture. For example, the picture is a low-resolution picture reconstructed by an image or video decoder.

The tool determines an interpolated pixel value between a set of the pixel values of the picture. For example, the interpolated pixel value is located between four pixel values of the picture, at a diagonal to each of the four adjacent pixel values of the picture. In determining the interpolated pixel value, the tool uses auto-regressive edge-directed interpolation that incorporates a backward projection constraint (AR-EDIBC). For example, as part of the AR-EDIBC, the tool computes auto-regressive (AR) coefficients from those of the pixel values of the picture that are in a local window around the position of the interpolated pixel value, then applies the AR coefficients to the set of pixel values to determine the interpolated pixel value. As part of the backward projection constraint, the computation of the AR coefficients considers effects of applying the AR coefficients to interpolated pixel values, as if to project the interpolated pixel values back for comparison to original pixel values of the picture. In some implementations, the computation of the AR coefficients uses a closed-form solution that incorporates both forward prediction (from original pixel values to create interpolated pixel values) and the backward projection constraint (projecting back from the interpolated pixel values).

The tool stores the interpolated pixel value. For example, the tool stores the interpolated pixel value as part of a high-resolution picture in memory, along with pixel values of a low-resolution picture that have been copied into the high-resolution picture. The tool can later output some or all of the high-resolution picture for display.

In some implementations, the tool adapts one or more parameters of the AR-EDIBC. For example, the tool adjusts the size or shape of the local window used in AR-EDIBC depending on image characteristics around the position of the interpolated pixel value. Or, the tool changes the weighting applied to different pixel values in the local window depending on which of those pixel values have neighbors like the neighbors of the interpolated pixel value. Or, the tool changes the weighting applied to different pixel values in the local window depending on proximity to the position of the interpolated pixel value. Or, the tool changes the weighting applied to different pixel values in the local window depending on self-similarity of patches in the picture.

The tool can selectively use adaptive interpolation within a picture depending on content, so as to trade off quality of interpolation and computational complexity. For example, the tool performs interpolation in multiple stages for pixel values at different positions in a high-resolution picture, using AR-EDIBC to determine certain interpolated pixel values at diagonal positions between original pixel values, but using a computationally simpler form of interpolation (such as bi-linear, bi-cubic, Lanczos or Sinc interpolation) to determine pixel values at other positions. Or, the tool can use a simpler form of interpolation in boundary regions (for which the pixel values in a local window used in AR-EDIBC would be outside the picture) or in smooth areas (for which the quality benefits of AR-EDIBC are outweighed by the computational cost).

This Summary is provided to introduce a selection of concepts in a simplified form that are further described below in the Detailed Description, which proceeds with reference to the accompanying figures. This Summary is not intended to identify key features or essential features of the claimed subject matter, nor is it intended to be used to limit the scope of the claimed subject matter.

The foregoing and other features and advantages of the disclosure will become more apparent from the following Detailed Description, which proceeds with reference to the accompanying figures.

DETAILED DESCRIPTION

Due to practical limitations on storage space for digital image/video content, and due to practical limitations on network bandwidth when digital image/video content is delivered, digital image/video content often has a low resolution. When low-resolution image/video content is expanded to a higher resolution and presented on a display, quality defects such as blurring and blocking are especially noticeable. Thus, there is a need for improving the process of resolution enhancement, which is generally known as super-resolution processing or intelligent up-sampling.

There are various techniques for image and video interpolation, which can be used for resolution enhancement (also called super-resolution processing or intelligent up-sampling). Known linear interpolation schemes that assume a space-invariant stationary image signal typically fail to capture the fast-changing characteristics and local characteristics of textures, edges and object contours. As a result, such interpolation schemes often produce interpolated images that have blurred or thicker textures, edges and object contours.

With natural images, textures, edges and object contours can change suddenly within a picture. Even so, there exists a duality between low-resolution and high-resolution versions of an image. That is to say, significant features of textures, edges or object contours which appear in a high-resolution version also appear in a low-resolution version of the image. As long as the features are significant enough, the features will not disappear by down-sampling from high resolution to low resolution. Moreover, natural images are often locally stationary in a small area of pixels (such as a 5×5 local window or a circle of 21 pixels). With the ever-increasing computational power of computing hardware for image and video processing (such as multiple processing cores and graphics processors), auto-regressive edge-directed interpolation with a backward projection constraint (AR-EDIBC) can be applied in the spatial domain to achieve high-quality super-resolution enhancement of low-resolution image/video content. For example, AR-EDIBC can be applied when up-sampling VGA video from a camera for playback on a high-resolution display, when up-sampling low-resolution Web video for playback a full-screen window on a personal computer monitor, or in various other use scenarios.

I. AR-EDIBC Examples and Explanation

Figure 1A:
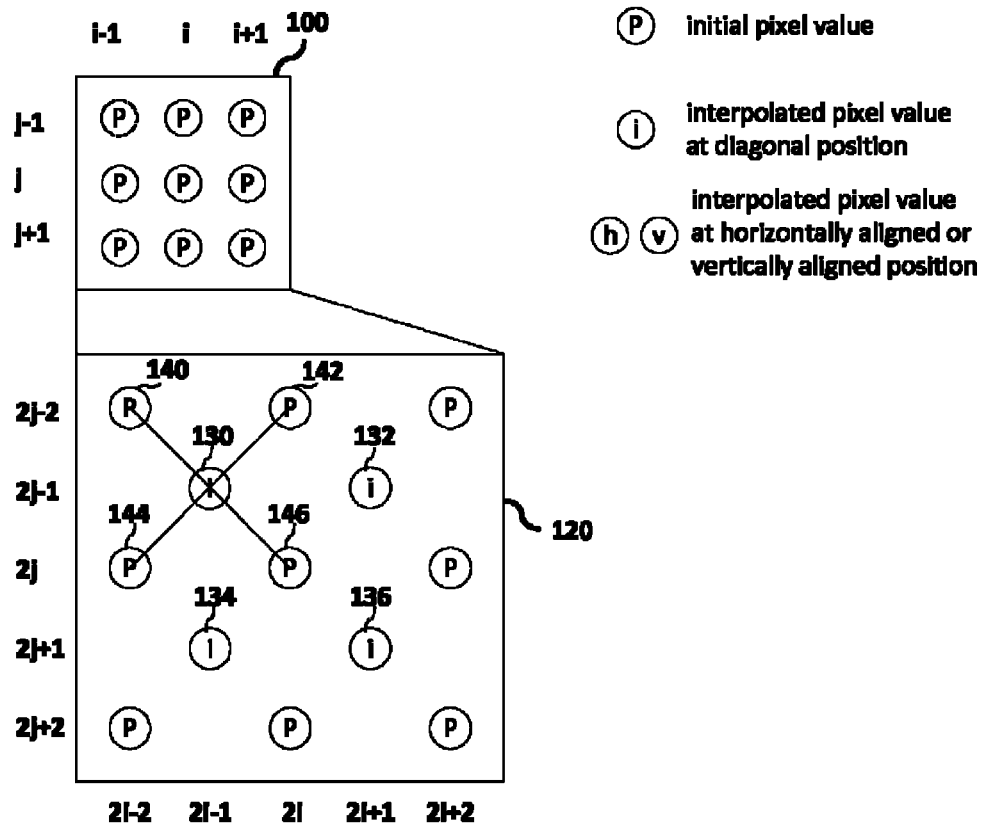
FIG. 1A is a diagram illustrating pixel values in a first stage of an up-sampling process that interpolates pixel values using auto-regressive edge-directed interpolation with a backward projection constraint (AR-EDIBC).
Figure 1B:
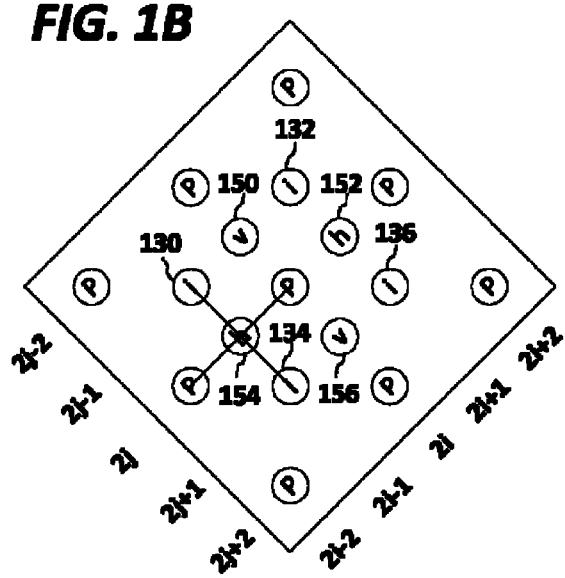
FIG. 1B is a diagram illustrating pixel values in a second stage of an up-sampling process that interpolates pixel values using interpolated pixel values from AR-EDIBC.

FIGS. 1A-B show pixel values in a resolution enhancement process using AR-EDIBC. In FIG. 1A, a 3×3 portion of a low-resolution image 100 includes initial pixel values of the low-resolution image. The low-resolution pixel values are copied from positions (i, j) of the low-resolution image into positions (2i, 2j) of a high-resolution image 120, of which a 5×5 portion is shown. High-resolution diagonal pixel values 130, 132, 134, 136 are determined at positions +1 horizontally and +1 vertically from the copied pixels using AR-EDIBC.

To accomplish AR-EDIBC, auto-regressive (AR) coefficients are calculated with the assumptions of (1) duality between resolutions and (2) the image being locally stationary. Also, in the AR-EDIBC a backward projection constraint is used to check that the AR coefficients are stable and reliable enough to yield good prediction from high-resolution diagonal pixel values back to the copied pixel values from the low-resolution image.

In the example shown in FIG. 1A, AR coefficients are calculated for interpolation of the high-resolution diagonal pixel value 130 based on neighboring pixel values 140, 142, 144, 146 copied from the low-resolution image. Equation 1 illustrates application of the AR coefficients to the neighboring pixel values:

$$Y_{2i+1,2j+1} = \Sigma_{k=0}^{1} \Sigma_{l=0}^{1} \alpha_{2k+l} Y_{2(i+k),2(j+l)} \qquad (1),$$

where $Y_{2i+1,2j+1}$ is the interpolated pixel value at the diagonal position for the high-resolution picture, $\Sigma_{k=0}^{1} \Sigma_{l=0}^{1} \alpha_{2k+l}$ are the four AR coefficients for the neighbor pixel values, and $\Sigma_{k=0}^{1} \Sigma_{l=0}^{1} Y_{2(i+k),2(j+l)}$ are the neighboring pixel values at positions (2i, 2j), (2i, 2j+2), (2i+2, 2j) and (2i+2, 2j+2) around the position of the interpolated pixel value.

After diagonal pixel values 130, 132, 134, 136 are determined using AR-EDIBC, vertically aligned pixel values 150, 156 and horizontally aligned pixel values 152, 154 can be determined by applying a second iteration of AR-EDIBC with a (conceptual) rotation of 45 degrees, as shown in FIG. 1B, or with another form of interpolation. With the 45-degree rotation, the vertically aligned pixel values and horizontally aligned pixel values 150, 152, 154, 156 are determined as diagonal from the copied pixel values of the low-resolution image and the determined diagonal pixel values 130, 132, 134, 136. For example, for a given vertically aligned pixel value or horizontally aligned pixel value, AR coefficients or other weights are applied to four neighbor pixel values as shown in Equation 1.

Generally, the AR coefficients applied during AR-EDIBC are calculated by estimation from initial pixel values of the low-resolution picture. To provide an additional safeguard that the AR coefficients are reliable for forward prediction to determine pixel values of the high-resolution picture, a backward projection constraint is also considered. For the backward projection constraint, projection errors from estimated pixel values in the high-resolution picture back to the known initial pixel values of the low-resolution picture are considered as a constraint.

Figure 2A:
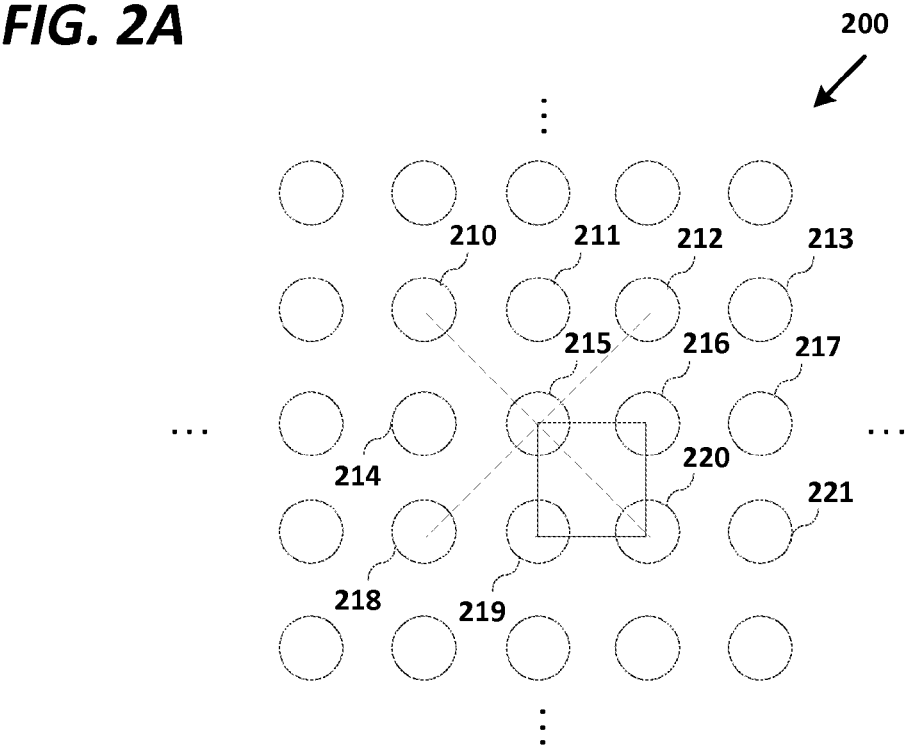
FIG. 2A and FIG. 2B are diagrams illustrating forward prediction of AR coefficients for interpolation of pixel values for a high-resolution picture using AR-EDIBC.

FIG. 2A shows a local window 200 comprising 25 pixel values from a low-resolution image. The four initial pixel values 215, 216, 219 and 220 are used to interpolate the value of pixel value 252. When estimating the value of pixel value 252 in high resolution from its four neighboring pixel values 215, 216, 219, 220 copied from a low-resolution image, auto-regressive (AR) coefficients for the four neighbor pixel values 215, 216, 219, 220 are determined. For another interpolated pixel value, even one interpolated using one of the same initial pixel values 215, 216, 219, 220, other AR coefficients may be computed. For example, for interpolation of pixel value 254, AR coefficients are computed for the initial pixel values 216, 217, 220, 221. To predict the relationship between a given interpolated pixel value (e.g., pixel value 252) and its four diagonal neighbors (e.g., initial pixel values 215, 216, 219, 220), the relationship between a given initial pixel value (e.g., initial pixel value 215) and its four known diagonal neighbors (e.g., initial pixel values 210, 212, 218, 220) is considered.

With the assumption of images being locally stationary, and with the assumption of duality between low-resolution and high-resolution images, AR coefficients $\alpha_i$ are estimated from known initial pixel values in a local window (e.g., 5×5 window of initial pixel values around the position of the interpolated pixel value, small circle of initial pixel values around the position of the interpolated pixel value, or local window having other size or shape). For example, the unknown coefficients $\alpha_i$ of known neighboring pixel values 215, 216, 219, 220 are obtained from the known initial pixel values within the chosen local window. In FIG. 2A, the AR coefficients (four unknowns) for the four neighboring pixel values 215, 216, 219, 220 are obtained from the 5×5 local window 200 of 25 known pixel values.

The AR coefficients can be determined by solving the minimization problem in Equation 2, which uses minimizes least mean square error (LMSE) between two terms $C\vec{\alpha}$ and $\vec{Y}$:

$$\vec{\alpha} = \min(C \times \vec{\alpha} - \vec{Y})^2 \qquad (2),$$

where $\vec{\alpha} = (\alpha_1, \alpha_2, \alpha_3, \alpha_4)$ is a vector of AR coefficients for the low-resolution pixels, $\vec{Y}$ is a column vector of the pixels in the local window, and C is a matrix with a number of columns relating to the number of pixel values in the local window and a number of rows relating the number of AR coefficients. The LMSE calculation of Equation 2 can be determined using the closed-form solution in Equation 3:

$$\vec{\alpha} = (C^T \times C)^{-1} \times (C^T \times \vec{Y}) \qquad (3),$$

where $\vec{\alpha} = (\alpha_1, \alpha_2, \alpha_3, \alpha_4)$, $\vec{Y}$ and C are defined the same as they were defined in Equation 2, $C^T$ is the matrix transpose of C, and $(C^T \times C)^{-1}$ is the inverse of the square matrix $(C^T \times C)$. Alternatively, the LMSE calculation of Equation 2 is carried out using another approach.

Figure 2B:
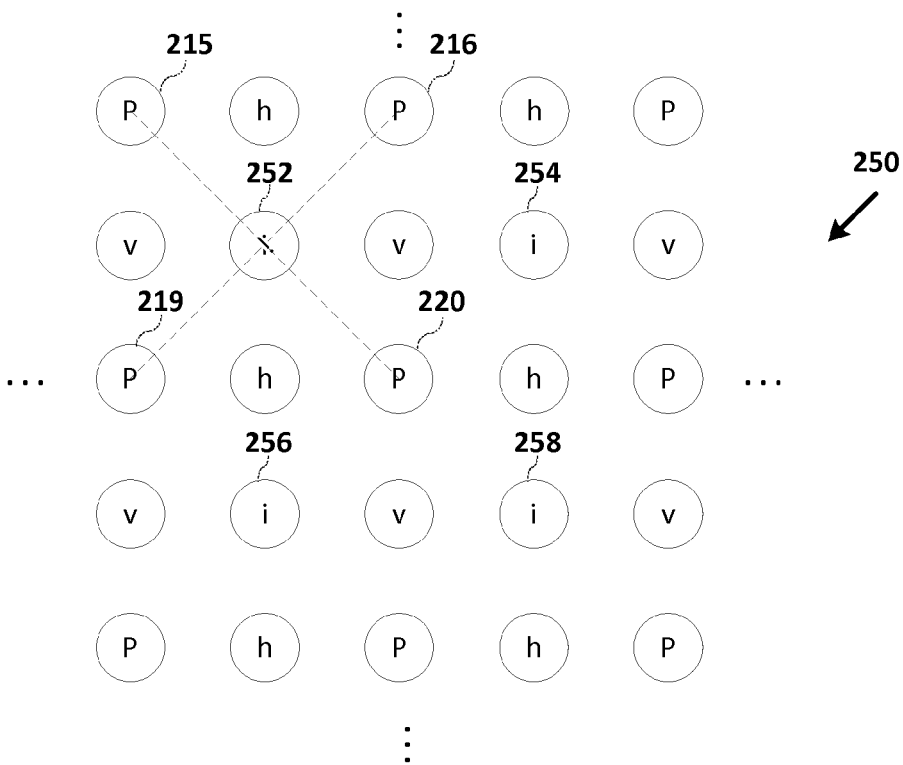

In the example depicted in FIG. 2A and FIG. 2B, where a high-resolution pixel value 252 is interpolated using known pixel values 215, 216, 219, 220 within a 5×5 local window 200, $\vec{Y}$ is a column vector of the 25 pixel values in the 5×5 local window 200. C is a 25×4 matrix with one column for each of the 25 pixel values in the local window, the column including four diagonal neighbor initial pixel values for that pixel value of the local window. For example, the column of C for pixel value 215 includes the diagonal neighbor pixel values 210, 212, 218 and 220, as illustrated in FIG. 2A. Similarly, the column of C for pixel value 216 includes the diagonal neighbor pixel values 211, 213, 219 and 221. For a given position of interpolated pixel value, the four AR coefficients $\alpha_1, \alpha_2, \alpha_3, \alpha_4$ are determined as the product of the 4×4 matrix $(C^T \times C)^{-1}$ and the 4×1 matrix $(C^T \times \vec{Y})$. In this way, the values $\alpha_1, \alpha_2, \alpha_3, \alpha_4$ that are to be applied to the initial pixel values 215, 216, 219, 220 are determined as a function of the way each pixel value in the 5×5 local window 200 relates to its four diagonal neighbor initial pixel values.

In some implementations, as shown in FIG. 2A, the local window 200 has a fixed size and shape. Alternatively, the local window varies in size and/or shape so as to adapt to local characteristics of image content around the position of the interpolated pixel value. For example, size of the local window can increase in stable areas of an image and decrease in unstable areas of the image. In theory, the local window can be chosen to include a number of pixel values up to the number of pixels in the image, although generally the local window is sized to account the local stationary characteristics of the image. Also, the pixel values in the local window can be in various pixel orientations (e.g., circular window or a rectangular window).

In some implementations, as explained with reference to FIG. 2A and FIG. 2B, each of the pixel values in the local window 200 is considered and given equal weight when determining AR coefficients. Alternatively, outlier values are discarded or discounted. For example, pixel values in the local window are selectively used or not used when determining AR coefficients, or pixel values in the local window are otherwise differentially weighted when determining AR coefficients. Thus, pixel values of the local window that have neighboring pixel values with similar features to the neighboring pixel values around the position of the pixel value to be estimated may be used, while other pixel values in the local window are not used. In FIG. 2, for example, the four diagonal neighbors 210, 212, 218 and 220 of pixel value 215 are used if similar to the pixel values 215, 216, 219 and 220, respectively, but otherwise not used. A similarity metric such as mean square error, sum of squared differences or other metric can be used for this determination. Or, different weights can be applied to pixel values in the local window 200 according to spatial location/distance from the position of the interpolated pixel value, or according to similarity of neighboring pixel values using a similarity metric. Self-similarity of patches of known pixel values from the low-resolution image can be used to identify more similar pixel values for AR coefficients estimation.

FIGS. 1A, 1B and 2 and Equations 1-3 generally illustrate aspects of forward prediction in AR-EDIBC. According to the assumption of local stationary and the duality property, backward projections from estimated pixel values to known initial pixel value can serve as an additional constraint on the results of a forward auto-regressive edge-directed interpolation for robustness and reliability. Considering a backward projection constraint tends to make AR coefficients more stable and reliable, and it improves interpolation quality in many instances.

Figure 3A:
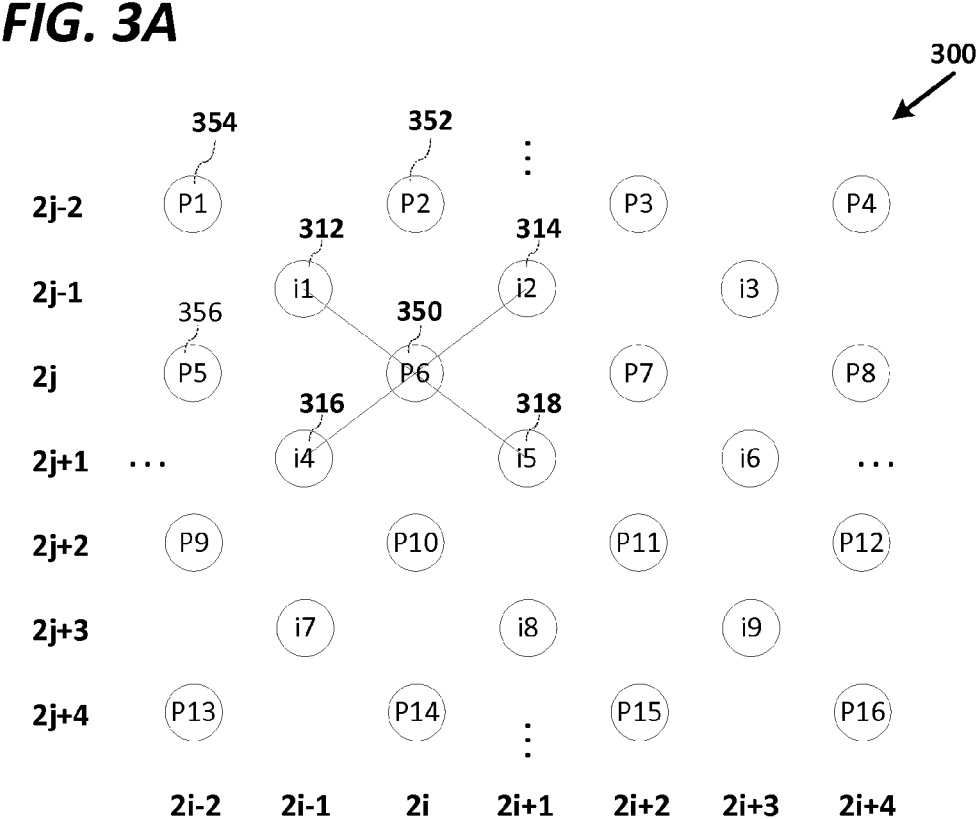
FIG. 3A is a diagram illustrating use of backward projection as a constraint in auto-regressive edge-directed interpolation.

For example, as depicted in FIG. 3A, a backward projection from diagonal pixel values 312, 314, 316, 318 is considered against the initial pixel value 350 copied from the low-resolution image, and backward projections from other diagonal pixel values are similarly considered against other initial pixel values, to verify, in satisfaction, that backward projection yields results consistent with forward prediction.

Equation 1 can be expressed in the form of vector and matrix operations as shown in Equation 4.

$$\vec{Y}_h = A \times \vec{Y}_l \quad (4),$$

where $\vec{Y}_h$ is a column vector of the set of diagonal pixel values to be estimated in a local window, $\vec{Y}_l$ is a column vector that holds the neighbor initial pixel values for the elements in $\vec{Y}_h$, and A is a matrix with a number of rows corresponding to the number of pixel values to be estimated in the local window, where each row of the matrix A holds AR coefficients at the right positions which correspond to the neighboring pixel values for each element in $\vec{Y}_h$. In the example depicted in FIG. 3A, $\vec{Y}_l$ is a column vector of sixteen elements P1 to P16 that holds the four neighbor pixel values for each of the nine elements in $\vec{Y}_h$:

$$\vec{Y}_l = \begin{bmatrix} P1 \\ P2 \\ P3 \\ P4 \\ P5 \\ P6 \\ P7 \\ P8 \\ P9 \\ P10 \\ P11 \\ P12 \\ P13 \\ P14 \\ P15 \\ P16 \end{bmatrix}$$

The matrix A is a 9×16 matrix with rows each holding AR coefficients (e.g., elements in d for the known pixels) at the right positions.

$$A = \begin{bmatrix} \alpha_1^{i1} & \alpha_2^{i1} & 0 & 0 & \alpha_3^{i1} & \alpha_4^{i1} & 0 & 0 & 0 & 0 & 0 & 0 & 0 & 0 & 0 & 0 \\ 0 & \alpha_1^{i2} & \alpha_2^{i2} & 0 & 0 & \alpha_3^{i2} & \alpha_4^{i2} & 0 & 0 & 0 & 0 & 0 & 0 & 0 & 0 & 0 \\ 0 & 0 & \alpha_1^{i3} & \alpha_2^{i3} & 0 & 0 & \alpha_3^{i3} & \alpha_4^{i3} & 0 & 0 & 0 & 0 & 0 & 0 & 0 & 0 \\ 0 & 0 & 0 & 0 & \alpha_1^{i4} & \alpha_2^{i4} & 0 & 0 & \alpha_3^{i4} & \alpha_4^{i4} & 0 & 0 & 0 & 0 & 0 & 0 \\ 0 & 0 & 0 & 0 & 0 & \alpha_1^{i5} & \alpha_2^{i5} & 0 & 0 & \alpha_3^{i5} & \alpha_4^{i5} & 0 & 0 & 0 & 0 & 0 \\ 0 & 0 & 0 & 0 & 0 & 0 & \alpha_1^{i6} & \alpha_2^{i6} & 0 & 0 & \alpha_3^{i6} & \alpha_4^{i6} & 0 & 0 & 0 & 0 \\ 0 & 0 & 0 & 0 & 0 & 0 & 0 & 0 & \alpha_1^{i7} & \alpha_2^{i7} & 0 & 0 & \alpha_3^{i7} & \alpha_4^{i7} & 0 & 0 \\ 0 & 0 & 0 & 0 & 0 & 0 & 0 & 0 & 0 & \alpha_1^{i8} & \alpha_2^{i8} & 0 & 0 & \alpha_3^{i8} & \alpha_4^{i8} & 0 \\ 0 & 0 & 0 & 0 & 0 & 0 & 0 & 0 & 0 & 0 & \alpha_1^{i9} & \alpha_2^{i9} & 0 & 0 & \alpha_3^{i9} & \alpha_4^{i9} \end{bmatrix}$$

In a given row for an interpolated pixel value, the matrix A has zero-value elements for positions corresponding to initial pixel values that are not diagonal neighbors of the interpolated pixel value. All but four of the elements in a row are zero, and the four non-zero values have the appropriate weights $\vec{\alpha} = (\alpha_1, \alpha_2, \alpha_3, \alpha_4)$ to be applied to initial pixel values around the position for the interpolated pixel value. The resulting matrix $\vec{Y}_h$ is a column vector of the nine diagonal pixel values i1 to i9 in local window 300:

$$\vec{Y}_h = \begin{bmatrix} i1 \\ i2 \\ i3 \\ i4 \\ i5 \\ i6 \\ i7 \\ i8 \\ i9 \end{bmatrix}.$$

The additional backward projection constraint can be expressed as shown in Equation 5.

$$\vec{Y}_h = \min(B \times \vec{Y}_h - \vec{Y}_l)^2 \quad (5),$$

where $\vec{Y}_h$ and $\vec{Y}_l$ are defined as in Equation 4, and where B is a 16×9 matrix that holds AR coefficients at the right positions. Generally, each row of B holds AR coefficients at the positions which correspond to the neighboring pixel values for each element in $\vec{Y}_l$. For example, the matrix B is the transpose $A^T$ of the matrix A. Alternatively, the AR coefficients of the matrix B can be computed from known initial pixel values in a local window, like the values of the matrix A are computed, but following a different pattern among the initial pixel values.

The AR coefficients for the matrix A can be found using a closed-form solution from $\vec{Y}$ and C as explained with reference to Equation 2. A similar closed-form solution for Equation 5 is:

$$\vec{Y}_h = (B^T \times B)^{-1} \times (B^T \times \vec{Y}_l) \quad (6),$$

Substituting A for $B^T$, and substituting $A^T$ for B, yields:

$$\vec{Y}_h = (A \times A^T)^{-1} \times (A \times \vec{Y}_l) \quad (7),$$

where the AR coefficients of the matrix A can be derived from the initial pixel values of $\vec{Y}$ and C, where the term $(A \times \vec{Y}_l)$ indicates forward prediction from the initial pixel values of $\vec{Y}_l$ using the AR coefficients, and where the term $(A \times A^T)^{-1}$ modifies those results depending on how the AR coefficients for one row in A relate to the AR coefficients for other rows in A, respectively. In this way, the interpolation of pixel values for $\vec{Y}_h$ accounts for backward projection using the AR coefficients, which were estimated from initial pixel values.

Figure 3B:
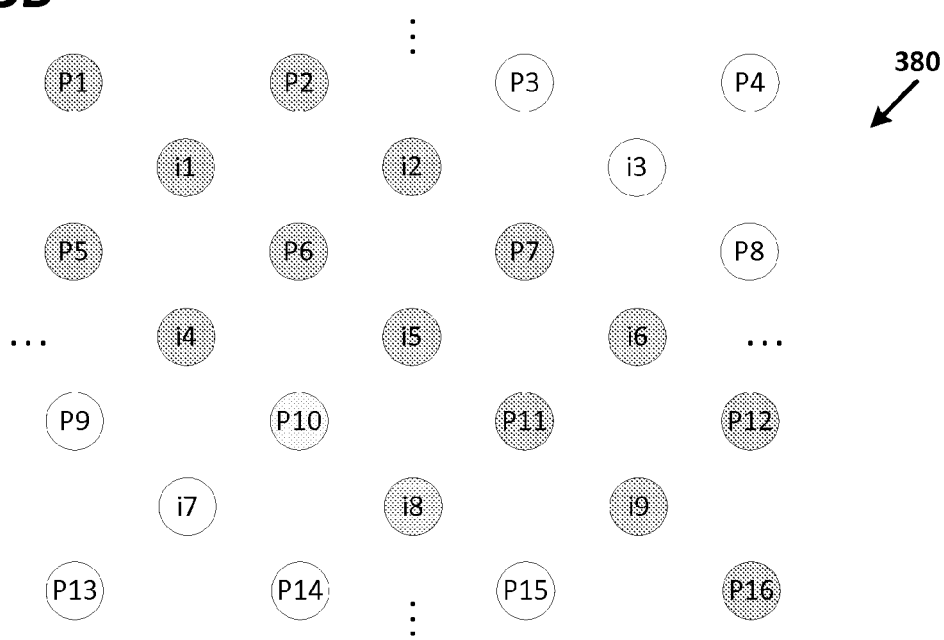
FIG. 3B is a diagram illustrating pixel values in a textured area that are filtered using AR-EDIBC.

FIG. 3B shows pixel values in a local window for which AR coefficients are computed. When the values of $(A \times A^T)^{-1}$ are applied to $(A \times \vec{Y}_l)$, intermediate pixel values in areas of the same part of the texture generally have more effect on the final result, and intermediate pixel values in other areas generally have less effect on the final result. In this way, the interpolation accounts for the effects of applying AR coefficients to project from interpolated pixel values back to initial pixel values.

Equation 4 and Equation 5 can be solved together by concatenating the equations into a LMSE optimization problem which minimizes the forward prediction errors and backward projection errors at the same time, as shown in Equation 8. In Equation 8, β is a weighting factor for weighting backward projection errors relative to forward prediction errors. The weighting factor β is selected for the implementation (e.g. a weighting of 0.3).

$$\vec{Y}_h = \arg_{\vec{Y}_h} \min[(A \times \vec{Y}_l - \vec{Y}_h)^2 + \beta(B \times \vec{Y}_h - \vec{Y}_l)^2] \quad (8),$$

Where A is the same as in Equation 4 and B is the same as in Equation 5. The matrices A and B can be expanded into higher dimension matrices F and W. The matrix F is based on A and is determined by rearranging elements of A to appropriate positions. The matrix W is based on A, B and β, and is determined by combining an identity matrix with rows in which elements of A are rearranged and rows in which elements of B, weighted by β, are rearranged. After expanding Equation 8 and reordering the matrices A and B into matrices F and W, Equation 8 could produce Equation 9:

$$\vec{Y}_h = \arg_{\vec{Y}_h} \min[(F \times \vec{Y}_l - W \times \vec{Y}_h)^2] \quad (9).$$

The interpolated pixel values for $\vec{Y}_h$ can then be determined using a closed-form solution, as Equation 9 is a standard LMSE problem. The closed-form solution for Equation 9 is, $$\vec{Y}_h = (W^T \times W)^{-1} \times (W \times (F \times \vec{Y}_l)) \quad (10)$$

where W, F, $\vec{Y}_h$, and $\vec{Y}_l$ are the same as in Equation 9.

In the foregoing examples, backward projection is diagonal from interpolated pixel values. Alternatively, other and/or additional backward projection constraints are considered. Due to the duality property, different backward projections can also serve as constraints. For example, backward projections to a pixel value other than a pixel value located diagonally can be used, such as a projection to a pixel value located horizontally, vertically or located a determined distance away from a given interpolated pixel value.

Figure 4:
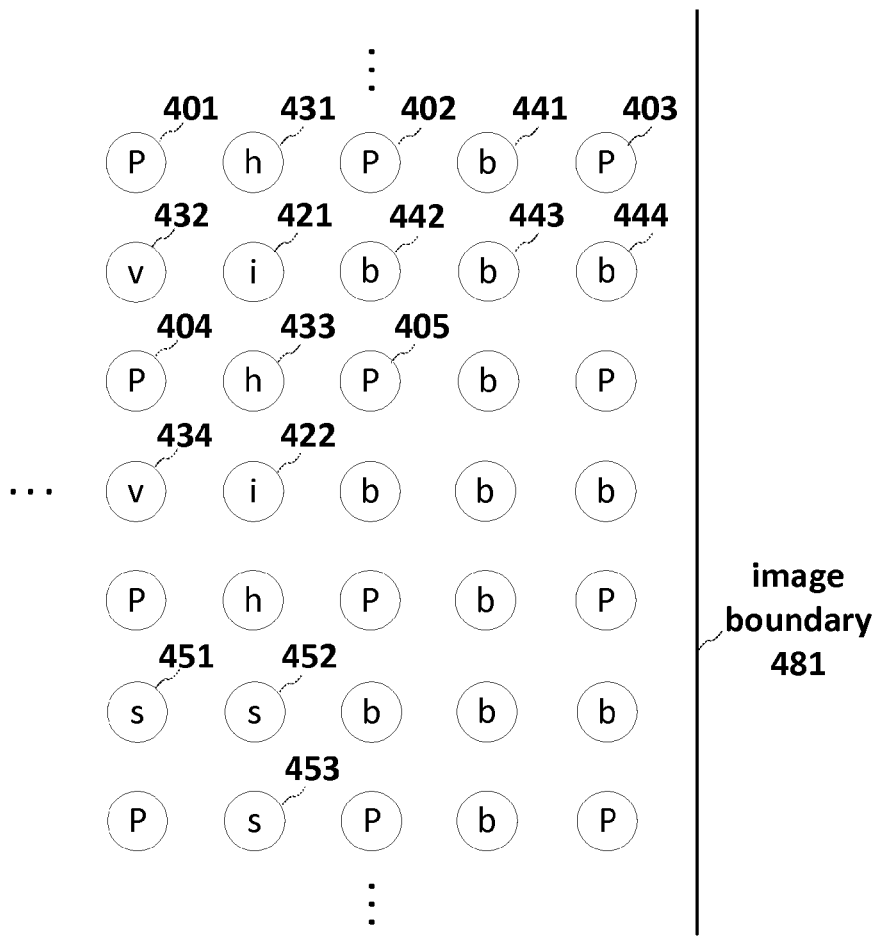
FIG. 4 illustrates a high-resolution image with interpolated pixel values resulting from AR-EDIBC that is selectively applied.

FIG. 4 shows a high-resolution image with interpolated pixel values resulting from AR-EDIBC and other forms of interpolation selectively applied at various positions. In FIG. 4, pixel values 401-405 and other initial pixel values are copied from a low-resolution image. Pixel values close to an image boundary 481 (such as pixel values 441, 442, 443 and 444) are interpolated using bi-linear interpolation, bi-cubic interpolation or another form of simple interpolation. For such boundary pixel values, the support region for AR-EDIBC would extend outside the image, making use of AR-EDIBC less justifiable considering the relative computational cost. Away from the boundary area of the image, pixel values in smooth areas (such as pixel values 451, 452 and 453) are interpolated using bi-linear interpolation, bi-cubic interpolation or another form of interpolation. For pixel values in smooth areas, the quality benefits of using AR-EDIBC may be outweighed by its computational cost. Two diagonal pixel values 421, 422 are interpolated using AR-EDIBC based on initial pixel values from the low-resolution image. Four pixel values 431, 432, 433 and 434 are interpolated at positions horizontal or vertically aligned with the initial pixel values using AR-EDIBC, AR-EDI or another form of interpolation. The pixel values 431-434 are interpolated from various other pixel values.

II. Generalized Technique for Performing AR-EDIBC

Figure 5:
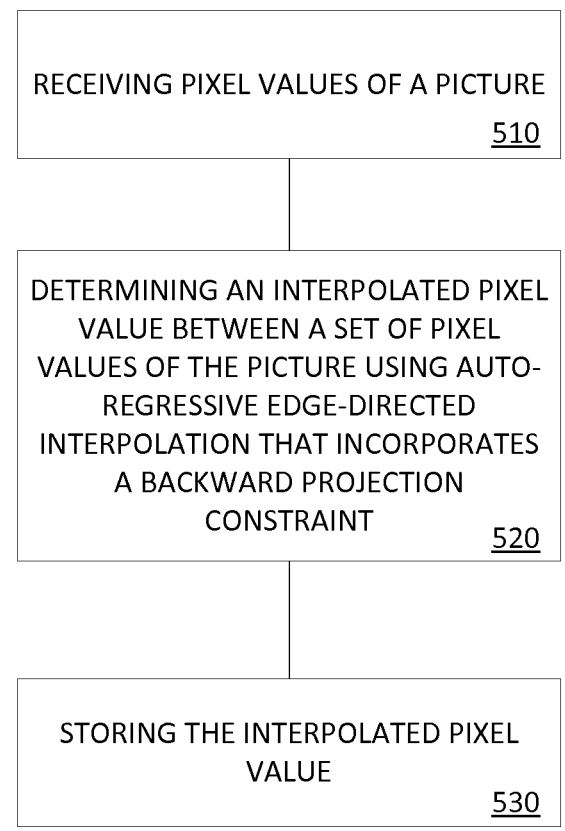
FIG. 5 is a flow chart illustrating a generalized method of determining an interpolated pixel value using AR-EDIBC.

FIG. 5 is a flow chart of a generalized method of interpolating a pixel value using AR-EDIBC. A tool such as a post-processing module (after a decoder), a decoder, or a display processing module performs the method shown in FIG. 5. Alternatively, another type of tool performs the method.

At block 510, the tool receives pixel values of a picture. For example, the picture is a low-resolution picture reconstructed by an image decoder, video decoder, or provided by some other resource.

At block 520, the tool determines an interpolated pixel value between a set of the pixel values of the picture. The determination of the interpolated pixel value uses AR-EDIBC. The details of the AR-EDIBC depend on implementation. For example, the tool computes AR coefficients from those of the initial pixel values of the picture that are in a local window around the position of the interpolated pixel value, then the tool applies the AR coefficients to the set of pixel values to determine the interpolated pixel value. (In this explanation of FIG. 5 and elsewhere, the term "interpolated pixel value" generally refers to the result of interpolation between a set of neighbor pixel values. For the sake of presentation, in the context of AR coefficient computation, the term "interpolated pixel value" can also refer to the to-be-interpolated value at the position for which the pixel value will be interpolated.)

As part of the backward projection constraint, the computation of the AR coefficients considers effects of applying the AR coefficients to interpolated pixel values. In some implementations, the tool iteratively determines AR coefficients from initial pixel values of the picture, applies the AR coefficients to determine interpolated pixel values, projects those interpolated pixel values back (using related AR coefficients) to assess differences compared to the initial pixel values of the picture, and uses the differences (error between the back-projection pixel values as compared to the initial pixel values) to adjust and improve the AR coefficients. In other implementations, the tool uses a closed-form solution that jointly considers forward prediction and the backward projection constraint to find the AR coefficients. For example, the tool uses a closed-form solution as described in section I with reference to equations (5)-(8) to jointly consider forward prediction and one or more backward projection constraints.

When the tool computes the AR coefficients, the tool can adjust processing to account for local variations in content. For example, the tool can adjust the size or shape of the local window depending on image characteristics around the position of the interpolated pixel value, increasing the size of the local window in smooth areas or decreasing the size of the local window in busier areas of the picture. The tool can also differentially weight pixel values (from the low-resolution picture) in the local window for various reasons. Pixel values that have similar features in their neighbors as the neighbors at the position of the interpolated pixel value can be given more weight, while other pixel values are given less weight. Or, pixel values in the local window that are closer to the position of the interpolated pixel value can be given more weight, compared to pixel values in the local window that are further from the position of the pixel value.

Returning to FIG. 5, at block 530, the tool stores the interpolated pixel value. The pixel value can be stored for further processing, outputting for display or for other uses. For example, the tool stores the interpolated pixel value in a picture buffer or other temporary storage along with other pixel values for a high-resolution picture. The high-resolution picture can also include pixel values directly copied from a low-resolution picture.

For the sake of presentation, FIG. 5 shows operations performed for a single interpolated pixel value using AR-EDIBC. In practice, the tool repeats the acts shown in FIG. 5 for different interpolated pixel values. For example, the tool performs the acts of FIG. 5 to determine interpolated pixel values for various different positions in a high-resolution image. When the tool performs AR-EDIBC for multiple interpolated pixel values, an act shown in FIG. 5 (e.g., receiving 510) can be consolidated so that the act is performed for multiple interpolated pixel values at the same time.

In addition, the acts shown in FIG. 5 can be performed selectively for some but not all interpolated pixel values for a high-resolution picture. For example, the tool determines an interpolated pixel value at a diagonal position in a first stage, applying AR coefficients determined with AR-EDIBC to a set of pixel values from a low-resolution picture, based on the detection whether the local area around the pixel value is complex enough to employ an AR-EDIBC. Then, in a second stage, the tool determines interpolated pixel values at vertically aligned positions and horizontally aligned positions (compared to the initial pixel values from the low-resolution picture) by applying AR coefficients determined with AR-EDIBC to a mix of first-stage interpolated pixel values and pixel values from the low-resolution picture in line with the vertical (or horizontal) position. Alternatively, the second-stage interpolation uses AR-EDI without a backward projection constraint or uses some other form of interpolation. The use of AR-EDIBC can also be contingent on whether the local area of an image is characterized by textured content (use AR-EDIBC) or smooth content (use another form of interpolation). Finally, the use of AR-EDIBC can be contingent on whether the position of the interpolated pixel value is in an interior region of the picture (use AR-EDIBC) or a boundary region of the picture (use another form of interpolation).

III. Selectively Performing AR-EDIBC

Figure 6:
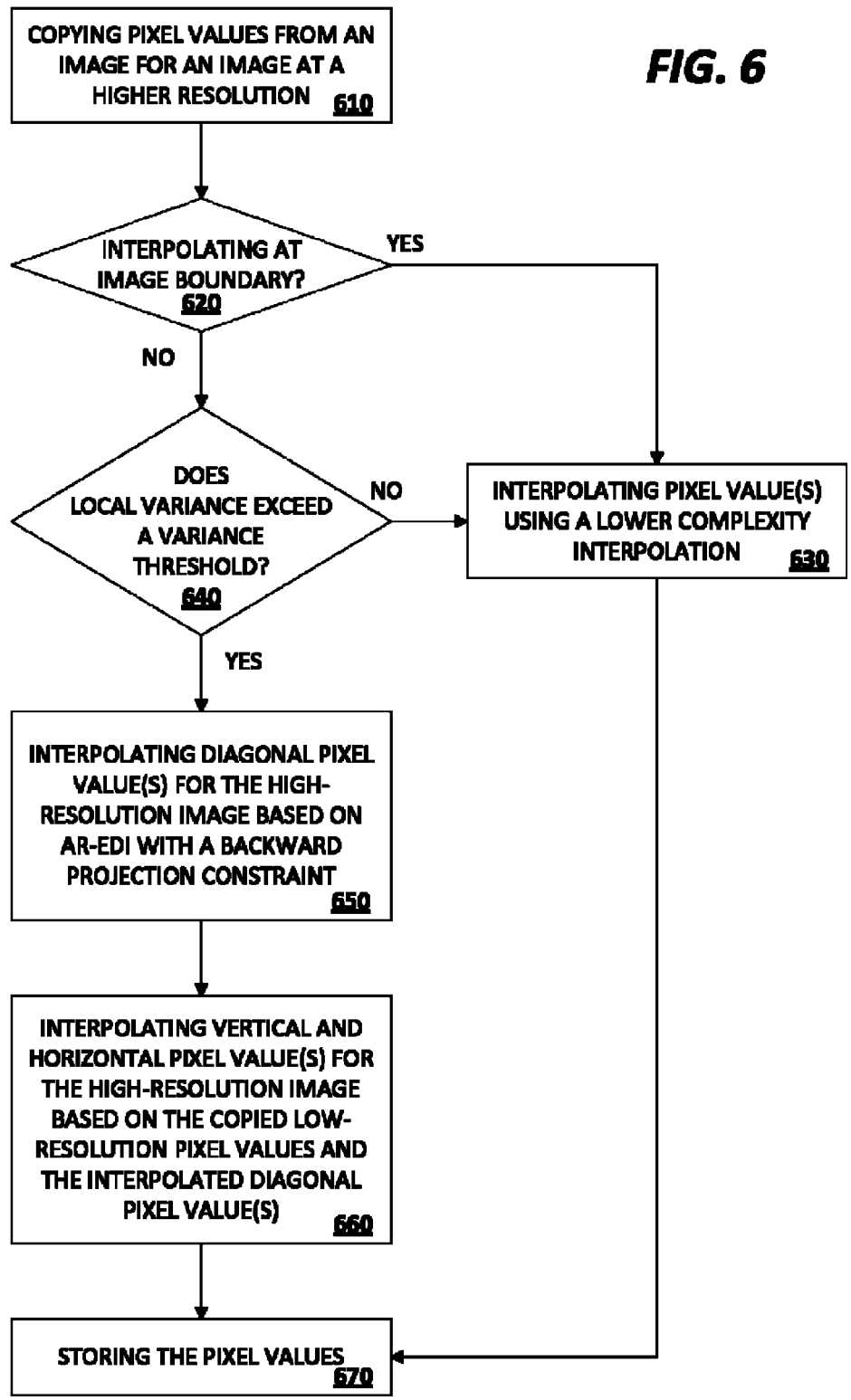
FIG. 6 is a flow chart illustrating an exemplary method of resolution enhancement selectively using AR-EDIBC.

FIG. 6 is a flow chart of a generalized method of interpolating a pixel value using selective AR-EDIBC. A tool such as a post-processing module (after a decoder), a decoder, or a display processing module performs the method shown in FIG. 6. Alternatively, another type of tool performs the method.

In FIG. 6, at block 610 pixels are copied from a first image for a second image at a higher resolution. For example, the pixels of a low-resolution image reconstructed from a video decoder with a resolution of 480×320 are copied into memory for a higher resolution image with resolution 960× 640 for up-scaling by a factor of two horizontally and vertically. More generally, selective AR-EDIBC can be used in repeated iterations to up-sample an image to an arbitrary resolution, or can be used in conjunction with other filtering to up-sample to arbitrary resolution. Further, selective AR-EDIBC can be used to increase resolution in a single direction (e.g., vertically or horizontally). For example, pixel values can be interpolated horizontally to known pixel values to increase only horizontal resolution. Or, selective AR-EDIBC can be applied to change aspect ratio. For example, pixel values can be interpolated to increase the horizontal resolution by one factor, and to increase the vertical resolution by a different factor.

At decision block 620, the tool determines whether the position of an interpolated pixel value is in a boundary region. AR-EDIBC may not be usable (or may be usable but not feasible) to interpolate pixel values near the edge of an image because neighboring pixel values for those interpolated pixel values would be outside of the image. In a local window used to compute AR coefficients, if many initial pixel values are missing, or if such initial pixel values would simply be provided by extrapolation from the image boundary, the computational cost of AR-EDIBC may outweigh the quality benefits.

In that case, at block 630, the tool interpolates one or more pixel values in the boundary region using a lower complexity form of interpolation. For example, the tool interpolates pixel values in a boundary region of the high-resolution image using bi-cubic or bi-linear interpolation. In some implementations, bi-linear interpolation or un-balanced interpolation is applied with refinements of local edge detection to determine interpolated pixel values along the top and left boundaries of an image, and image extrapolation is applied to determine interpolated pixel values along the bottom and right boundaries of the image, where neighboring initial pixel values are not available on one side. Just inside those image boundaries, bi-cubic interpolation is applied to determine interpolated pixel values for which parts of the local window would still be outside of the image.

At block 640 of FIG. 5, for an interpolated pixel value (or multiple pixel values) not in the boundary region, the tool determines whether a local variance measure exceeds a threshold variance value. That is to say, use of AR-EDIBC can be contingent on a local variance measure exceeding a threshold variance.

In natural images, generally 10 to 15 percent of pixels are for edges, textures, or object contours. Generally, AR-EDIBC is more computationally complex than filtering techniques such as bi-linear and bi-cubic interpolation. In some cases, AR-EDIBC is more complex by about two orders of magnitude. In other cases, by incorporating various performance improvements, AR-EDIBC is still 3 to 10 times more complex than bi-linear or bi-cubic interpolation, dependent on the image content. On the other hand, for areas of textures, edges and object contours in an image, AR-EDIBC provides significantly better interpolation than bi-linear or bi-cubic interpolation. Such benefits of AR-EDIBC on the visual quality of an image can be seen with scaling up to 2 times that of the original low-resolution image size. Thus, based on local characteristics of the image, AR-EDIBC can be selectively applied for those pixel values for which AR-EDIBC improves interpolation results, while using a simpler form of interpolation to save computational resources for other pixel values.

The local variance measure can be calculated compared to an average value, sum of squared differences compared to an average value, or some other metric for variance of pixel values in a local window. The local window can be centered around the position of an interpolated pixel value. Or, the local window (and decision about whether the area of an image is smooth or textured) can be made for multiple interpolated pixel values in a larger area of the image. A high local variance generally indicates an edge, texture, or object contour in part of an image. If the local variance measure exceeds the threshold T, then AR-EDIBC is used to determine the interpolated pixel value (or multiple pixel values for the local area) based on that determination. Thus, AR-EDIBC is selectively applied where local variance is determined to be greater, which generally indicates more local detail in the image. On the other hand, if the local variance is less than the threshold T, generally indicating less local detail in the image, then a less complex interpolation filtering technique such as bi-cubic or bi-linear interpolation is selected and applied to save computational resources, as shown in block 630.

At block 650, for a non-boundary, non-smooth area of the image, the tool interpolates one or more pixel values in a diagonal position of the high-resolution image using AR-EDIBC. For example, the tool uses a closed-form solution as described in section I with reference to equations (5)-(8) to jointly consider forward prediction and one or more backward projection constraints. A backward projection constraint helps safeguard against forward prediction with unstable or unreliable AR coefficients. A high-resolution image containing interpolated pixel values that can be projected to closely reproduce the low-resolution image is favored by using a backward projection constraint. As part of the backward projection constraint, the computation considers effects of applying the auto-regressive coefficients to interpolated pixel values. Error between the projections (from interpolated pixel values) and the actual initial pixel values can be reduced using various methods such as the LMSE technique discussed above, as well as other metrics including minimax, maximum likelihood, metrics that apply weighting to the pixels, and the like.

At block 660, the tool interpolates one or more pixel values in the high-resolution image based the copied pixel values and the interpolated pixel values at diagonal positions. For example, a second pixel value can be interpolated from copied low-resolution pixel values and the interpolated diagonal pixel values by applying AR-EDIBC in a second iteration, where the position of second pixel value is between the copied pixel values and interpolated diagonal pixel values. For example, the position of the second pixel value is horizontally or vertically aligned with some of the copied pixel values from the low-resolution image. The pixel values from a local window used for interpolation in the second iteration can be differently weighted based on their characteristics. For example, greater weight can be given to pixel values from the original low-resolution image, and less weight to the interpolated pixel values, as those pixel values can contain error. Also, the weighting can be based on the proximity to the position of the interpolated pixel value. Alternatively, in the second iteration of inter-polation, pixel values can be determined using only interpolated pixel values or pixel values from the original low-resolution image.

Alternatively, in block 660, the tool applies a simple forward auto-regressive edge-directed interpolation to reduce computational complexity in interpolating the one or more pixel values instead of using AR-EDIBC. In the second-stage interpolation for missing horizontally aligned positions and vertically aligned positions, half of the input pixel values come from the prediction in the first iteration of interpolation, and prediction errors may exist. Moreover, in some implementation, the prediction distance from four neighbors to missing pixel values is closer (by $$\frac{1}{\sqrt{2}})$$

than in the first iteration. Considering these factors, to reduce complexity, the backward projection constraint can be ignored for the second stage of interpolation. To avoid the accumulated errors from the first interpolation, when interpolating the one or more pixel values in the second stage, the original copied low-resolution pixel values are used instead of the diagonal pixel values from the first step.

In block 670, the copied pixel values, the pixel values generated in the first iteration, the pixel values generated in the second iteration, and any other interpolated pixel values are stored. The pixel values can be stored for further processing, outputting for display or for other uses. For example, the tool stores the pixel values in a picture buffer or other temporary storage for the high-resolution picture.

For the sake of presentation, FIG. 6 shows operations performed for a single interpolated pixel value (or a group of multiple interpolated pixel values in an area) using selective AR-EDIBC. In practice, the tool repeats the acts shown in FIG. 6 for different interpolated pixel values or different areas. For example, the tool performs the acts of FIG. 6 to determine interpolated pixel values for various different positions in a high-resolution image. When the tool performs AR-EDIBC for multiple interpolated pixel values, an act shown in FIG. 6 (e.g., copying 610) can be consolidated so that the act is performed for multiple interpolated pixel values at the same time.

IV. Example of AR-EDIBC

Figure 7A:
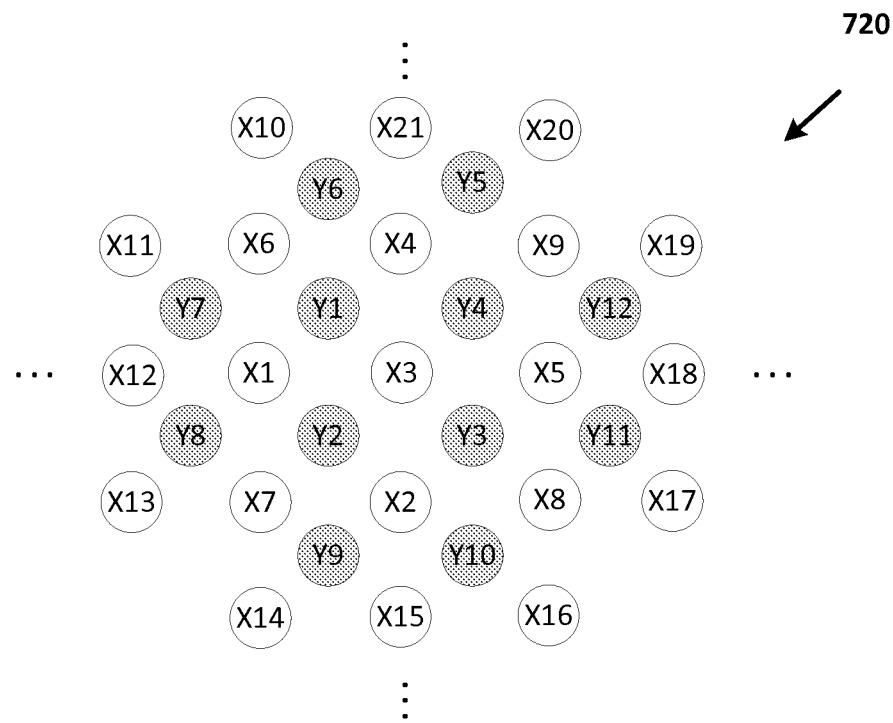
FIG. 7A illustrates part of a high-resolution image with known pixel values for interpolating four diagonal pixel values using AR-EDIBC.

With reference to FIG. 7A, consider initial pixel values in a hexagon area of 21 pixel values copied from a low-resolution image, indicated as pixel values X. Pixel values X are used to estimate the missing four diagonal pixel values Y1, Y2, Y3, Y4 in part of a high-resolution image 720. The high-resolution image 720 is double the image size of the low-resolution image (not shown) from where the pixel values X are copied. The pixel values X are ordered as in FIG. 7A, and as shown in FIG. 7D the pixel values can be as in the vector 730.

Figure 7B:
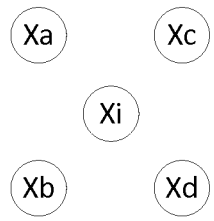
FIG. 7B illustrates known local pixel values used to predict another pixel value.

As shown in FIG. 7B, for each pixel value Xi at low resolution, there are four pixel values Xa, Xb, Xc, Xd around the pixel value Xi. The four pixel values Xa, Xb, Xc and Xd use the unknown AR coefficients in the local area to predict Xi. For the 21 pixel values X shown in FIG. 7B, 4×21 pixel values are used to predict the 21 pixel values X, respectively. The pixel values used to predict the 21 pixel values X can be as shown in FIG. 7E in matrix C 740.

In matrix C 740, each row holds the four pixel values at diagonal positions relative to the pixel value in the same row of $\vec{X}$ 730. For example, for the pixel value X1, the matrix C 740 holds the pixel values for X11, X13, X4 and X2. Then, for these values, the AR coefficients are:

$$\vec{a} = (C^T \times C)^{-1} \times (C^T \times \vec{X}) = [0.6202, 0.1335, -0.1809, 0.4588]^T$$

Without a backward projection constraint, the four missing diagonal pixel values Y1, Y2, Y3, and Y4 can be computed using Equation 4, $\vec{a}$ and the four pixel values around each of Y1, Y2, Y3, and Y4, respectively. For example, the values 0.6202, 0.1335, −0.1809, and 0.4588 could be applied to the pixel values X6, X1, X4 and X3, respectively, to compute the pixel value Y1 without a backward projection constraint.

Figure 7C:
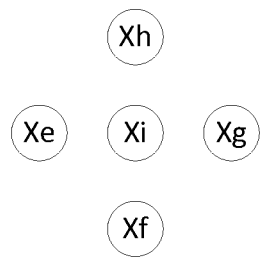
FIG. 7C illustrates local pixel values that back project to a known pixel value.

The backward projection constraint is illustrated in FIG. 7C. As shown by FIG. 7C, for each pixel value Xi of the pixel values X in FIG. 7A, there are four pixel values Xe, Xf, Xg and Xh which can backward project to Xi. As shown in FIG. 7F, these pixels can create a 4×21 matrix, such as matrix D 750.

In matrix D 750, each row holds the four pixel values left of, below, right of and above the pixel value in the same row of $\vec{X}$ 730. For example, for the pixel value X1, the matrix D 750 holds the pixel values for X12, X7, X3 and X6. With D 750 and $\vec{X}$ 730, the backward coefficients $\vec{b}$ are:

$$\vec{b} = (D^T \times D)^{-1} \times (D^T \times \vec{X}) = [0.3261, 0.1307, -0.3796, 0.1550]^T$$

Rearranging the forward prediction coefficients $\vec{a}$ and backward coefficients $\vec{b}$ according to Equation 9 can give Equation 11:

$$\vec{Y} = \arg_{\vec{Y}_h} \min[(F \times \vec{X} - W \times \vec{Y})^2] \quad (11)$$

In Equation 11, the matrix F can be as shown in FIG. 7G. In FIG. 7G, the matrix F 760 holds AR coefficients (e.g., elements in $\vec{a}$) in the appropriate positions for the position orientations shown in FIG. 7B. The first 12 rows in matrix F 760 correspond to the appropriate interpolated pixel value Y1 to Y12 in FIG. 7A. For example, row 1 in matrix F 760 holds AR coefficients 0.1335, 0.4588, −0.1809 and 0.6202 from $\vec{a}$ to be applied to X1, X3, X4 and X6, respectively, to compute the interpolated pixel value Y1 in FIG. 7A. The columns in matrix F 760 correspond to the appropriate known pixel value X of FIG. 7A. For example, column 1 corresponds to pixel X1 of FIG. 7A.

Figure 7H:

In Equation 11, the matrix W can be as shown in FIG. 7H. In matrix W 780, rows and columns 1-12 essentially hold an identity matrix. Rows 13-17 hold AR coefficients (e.g., elements in $\vec{a}$) in appropriate columns corresponding to interpolated pixel values around respective known pixels X1-X5 in FIG. 7A, for the position orientations shown in FIG. 7B. For example, row 13 in matrix W 780 holds AR coefficients −0.1809, 0.4588, 0.6202 and 0.1335 from $\vec{a}$ that could be applied to Y1, Y2, Y7 and Y8, respectively, to back project to pixel value X1 in FIG. 7A. Rows 18-21 hold weighted versions of AR coefficients (e.g., weighted elements in $\vec{b}$ made negative) in appropriate columns for the position orientations shown in FIG. 7C. The AR coefficients in rows 18-21 are applied to interpolated pixel values including and around respective interpolated pixel values Y1-Y4 in FIG. 7A, weighted according to the weighting factor. For example, row 18 in matrix W 780 holds AR coefficients 0.3000 (weighted version of 1), −0.0392, −0.1139, −0.0465 and −0.0978 from $\vec{b}$ that have been weighted by a factor of 0.3 (or −0.3) and that could be applied to Y1, Y2, Y4, Y6 and Y7, respectively, to determine a value for Y1 in FIG. 7A. For these values in the matrix W 780, the matrix F 760 and $\vec{X}$ 730, the missing diagonal pixels are:

$$\vec{Y} = (W^T \times W)^{-1} \times (W^T \times (F \times \vec{X})) = \begin{bmatrix} Y1 \\ Y2 \\ Y3 \\ Y4 \\ Y5 \\ Y6 \\ Y7 \\ Y8 \\ Y9 \\ Y10 \\ Y11 \\ Y12 \end{bmatrix} = \begin{bmatrix} 202.8840 \\ 169.2390 \\ 197.3240 \\ 195.8307 \\ 209.6655 \\ 204.1857 \\ 213.2224 \\ 150.0339 \\ 100.0259 \\ 127.9560 \\ 179.3478 \\ 170.3671 \end{bmatrix}$$

Only the elements $\vec{Y}(1)$, $\vec{Y}(2)$, $\vec{Y}(3)$, $\vec{Y}(4)$ are used as Y1, Y2, Y3, Y4, however. The other elements in $\vec{Y}$ (Y5 to Y12) are not located in the center of the window within which AR coefficients were computed, and hence may not be accurate.

V. Example Computing Environment

Figure 8:
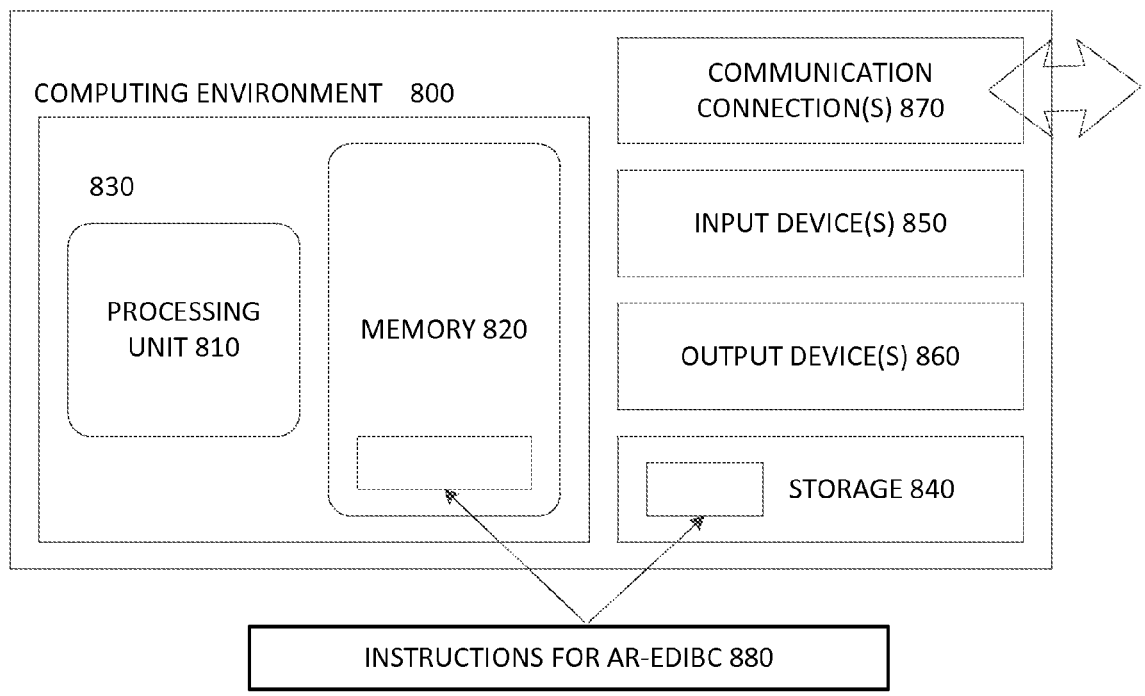
FIG. 8 is a diagram illustrating an exemplary computing environment in which described embodiments may be implemented.

FIG. 8 illustrates a generalized example of a suitable computing environment 800 in which described embodiments, techniques, and technologies may be implemented. The computing environment 800 is not intended to suggest any limitation as to scope of use or functionality of the technology, as the technology may be implemented in diverse general-purpose or special-purpose computing environments. For example, the disclosed technology may be implemented with any type of computing device, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 8, the computing environment 800 includes at least one processing unit 810 and memory 820. In FIG. 8, this most basic configuration 830 is included within a dashed line. The processing unit 810 executes computer-executable instructions. In a multi-processing system, multiple processing units execute computer-executable instructions to increase processing power and as such, multiple processors can be running simultaneously. The memory 820 may be volatile memory (e.g., registers, cache, RAM), non-volatile memory (e.g., ROM, EEPROM, flash memory, etc.), or some combination of the two. The memory 820 stores software 880 that can, for example, implement the technologies described herein. A computing environment may have additional features. For example, the computing environment 800 includes storage 840, one or more input devices 850, one or more output devices 860, and one or more communication connections 870. An interconnection mechanism (not shown) such as a bus, a controller, or a network, interconnects the components of the computing environment 800. Typically, operating system software (not shown) provides an operating environment for other software executing in the computing environment 800, and coordinates activities of the components of the computing environment 800.

The storage 840 may be removable or non-removable, and includes magnetic disks, magnetic tapes or cassettes, CD-ROMs, CD-RWs, DVDs, or any other medium which can be used to store information and which can be accessed within the computing environment 800. The storage 840 stores instructions for the software 880, which can implement technologies described herein.

The input device(s) 850 may be a touch input device, such as a keyboard, keypad, mouse, pen, or trackball, a voice input device, a scanning device, or another device, that provides input to the computing environment 800. The environment may also have a touch screen as an input device and display. For audio, the input device(s) 850 may be a sound card or similar device that accepts audio input in analog or digital form, or a CD-ROM reader that provides audio samples to the computing environment 800. The output device(s) 860 may be a display, printer, speaker, CD-writer, or another device that provides output from the computing environment 800.

The communication connection(s) 870 enable communication over a communication medium (e.g., a connecting network) to another computing entity. The communication medium conveys information such as computer-executable instructions, compressed video information, or other data in a modulated data signal.

Computer-readable media are any available media that can be accessed within a computing environment 800. By way of example, and not limitation, with the computing environment 800, computer-readable media include memory 820 and/or storage 840. As should be readily understood, the term computer-readable storage media includes the media for data storage such as memory 820 and storage 840, and not transmission media such as modulated data signals.

VI. Exemplary Implementation Environment

Figure 9:
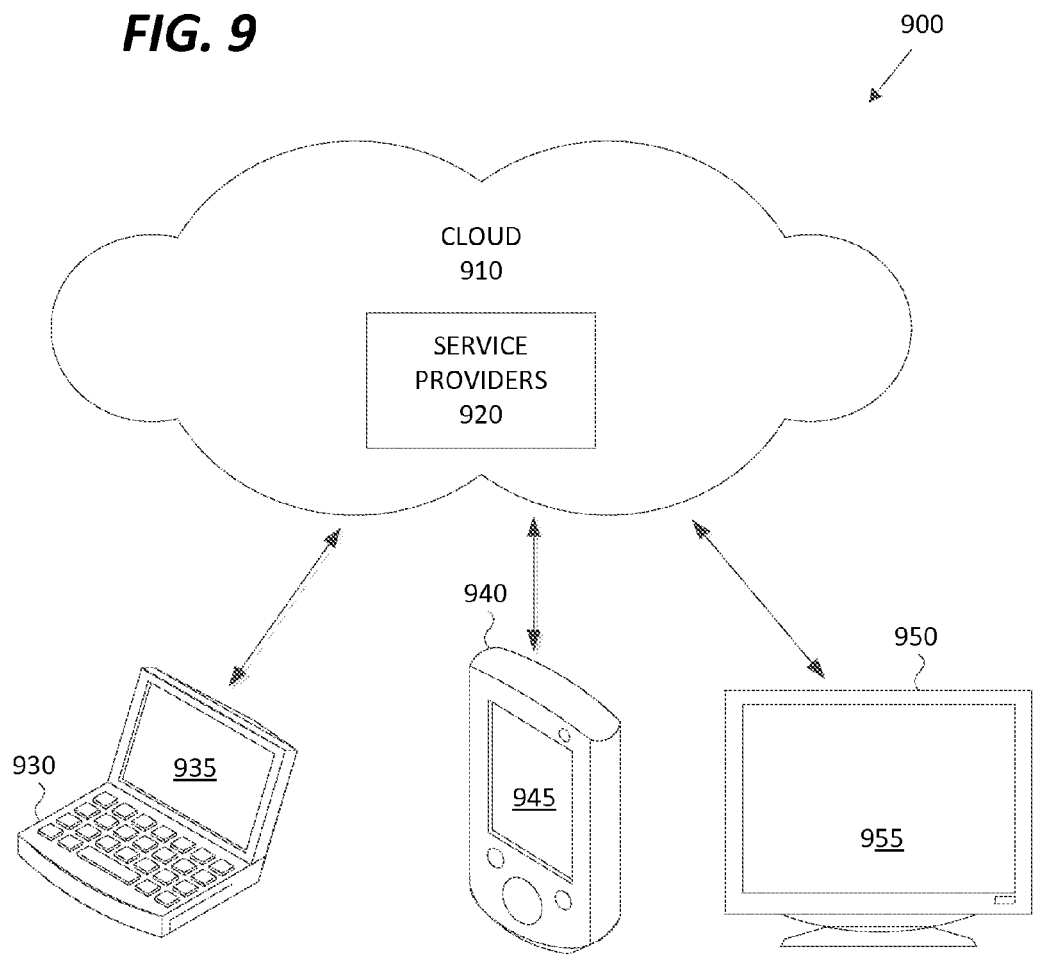
FIG. 9 is a diagram illustrating a generalized example of a suitable implementation environment in which described embodiments may be implemented.
Figure 9:
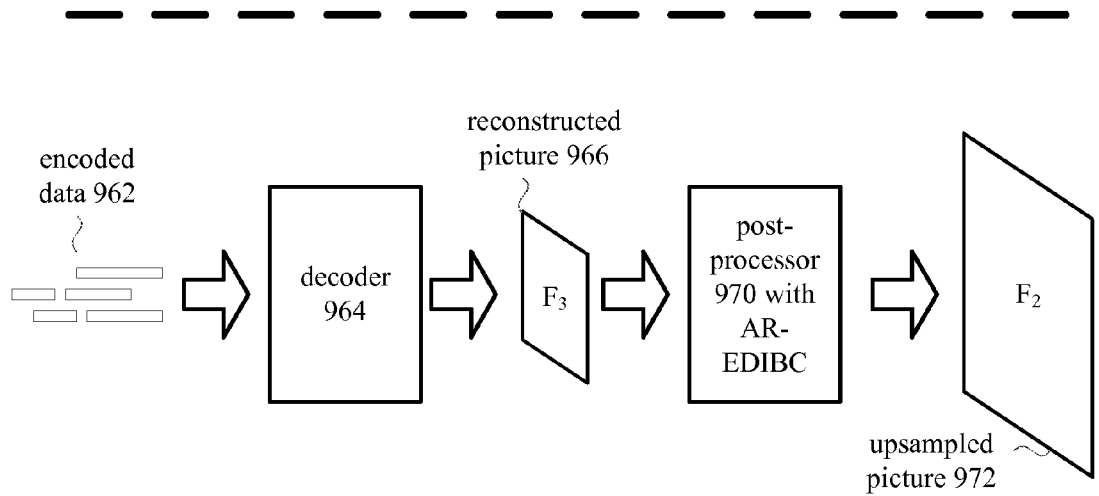

FIG. 9 illustrates a generalized example of a suitable implementation environment 900 in which the herein described embodiments, techniques, and technologies may be implemented.

In example environment 900, various types of services (e.g., computing services) are provided by a "cloud" 910. For example, the cloud 910 can comprise a collection of computing devices and displays, which may be located centrally or distributed, that provide cloud-based services to various types of users and devices connected via a network such as the Internet. The implementation environment 900 can be used in different ways to accomplish computing tasks. For example, some tasks (e.g., processing user input, presenting a user interface, display processing) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities and displays. Connected device 930 represents a device with a computer screen 935 (e.g., a mid-size screen). For example, connected device 930 can be a personal computer such as desktop computer, laptop, notebook, netbook, or the like. Connected device 940 represents a device with a mobile device screen 945 (e.g., a small size screen). For example, connected device 940 can be a mobile phone, smart phone, personal digital assistant, tablet computer, and the like. Connected device 950 represents a device with a large screen 955. For example, connected device 950 can be a television screen (e.g., a smart television) or another device connected to a television (e.g., a set-top box or gaming console) or the like. One or more of the connected devices 930, 940, 950 can include touch screen capabilities. Touchscreens can accept input in different ways. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touch screen capability of a particular connected device (e.g., connected devices 930, 940, 950). The service providers 920 can manage service subscriptions for users and/or devices (e.g., for the connected devices 930, 940, 950 and/or their respective users).

In the example environment 900, one of the connected devices 930, 940 or 950, one or more computing devices in the cloud 910, or one or more computing devices for the service providers 920 can perform the technique explained with reference to FIG. 2 or perform the technique explained with reference to FIG. 5. For example, a computing device in the cloud 910 provides encoded data 962 for an image or video to a connected device 930, 940 or 950. In the connected device 930, 940 or 950, a decoder 964 decodes the encoded data to produce one or more reconstructed pictures 966, such as the frame $F_3$ shown in FIG. 9. In the connected device 930, 940 or 950, a post-processor 970 or other display processor up-samples a reconstructed picture 966 to produce an up-sampled picture 972, such as the frame $F_2$ shown in FIG. 9. The post-processor 970 performs the up-sampling for display using AR-EDIBC for at least some of the interpolation in the up-sampling.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives) and executed on a computer (e.g., any commercially available computer, including smart phones or other mobile devices that include computing hardware). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. Likewise, the disclosed technology is not limited to any particular computer or type of hardware. Certain details of suitable computers and hardware are well known and need not be set forth in detail in this disclosure.

The present disclosure is directed toward aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. Any theories of operation are to facilitate explanation, but the disclosed systems, methods, and apparatus are not limited to such theories of operation.

VII. Exemplary Alternatives and Combinations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The terms "picture" and "image" are used interchangeably herein.

In many of the examples described herein, a pixel value is interpolated between four initial pixel values that neighbor the position of the interpolated pixel value. Alternatively, more or fewer initial pixel values are weighted to determine the final pixel value.

In many of the examples described herein, up-sampling by a factor of 2 is performed horizontally and vertically. Alternatively, up-sampling by some other factor is performed horizontally and/or vertically. For example, up-sampling by a factor of 2 is performed horizontally and vertically using selective AR-EDIBC, and then additional up-sampling is performed using bi-linear or bi-cubic interpolation by a factor of 2 horizontally and vertically, for overall scaling by a factor of 4 horizontally and vertically. Or, the additional up-sampling is by a factor of 1.5 horizontally and vertically, for overall scaling by a factor of 3 horizontally and vertically.

In many of the examples described herein, AR-EDIBC is used for up-sampling of reconstructed images before display. Alternatively, AR-EDIBC is used during another stage of processing. For example, AR-EDIBC is used for interpolation of reference pictures buffered for motion estimation or motion compensation. Or, AR-EDIBC is used for image sharpening for image editing applications. Or, as another example, AR-EDIBC is used for up-sampling of reference pictures in a scalable video encoding/decoding application.

In view of the many possible embodiments to which the principles of the disclosed technology may be applied, it should be recognized that the illustrated embodiments are examples and should not be taken as limiting the scope of the invention. Rather, the scope of the invention is defined by the following claims. We therefore claim as our invention all that comes within the scope of these claims.

We claim:

1. A computer-implemented method of pixel value interpolation, the method comprising;

receiving initial pixel values of a low-resolution picture;

determining an interpolated pixel value between a set of the initial pixel values of a local window of the low-resolution picture, wherein the determination of the interpolated pixel value uses auto-regressive edge-directed interpolation that incorporates a backward projection constraint, the backward projection constraint accounting for backward projection error for the initial pixel values of the local window around a position of the interpolated pixel value as a constraint on forward prediction for the interpolated pixel value, including:

computing auto-regressive coefficients from at least some of the initial pixel values of the low-resolution picture that are in the local window around the position of the interpolated pixel value, wherein, for the backward projection constraint, the computing considers effects of applying the auto-regressive coefficients in projection from interpolated pixel values back to the initial pixel values of the local window for comparison of the back-projected pixel values to corresponding ones of the initial pixel values of the local window; and applying the auto-regressive coefficients to the set of initial pixel values to determine the interpolated pixel value; and storing the interpolated pixel value as part of a high-resolution picture in memory, wherein the high-resolution picture also includes the initial pixel values of the low-resolution picture.

2. The computer-implemented method of claim 1 wherein the low-resolution picture is a low-resolution reconstructed picture from a video decoder.

3. The computer-implemented method of claim 1 wherein the computation of the auto-regressive coefficients uses a closed-form solution that incorporates both the forward prediction and the backward projection constraint.

4. The computer-implemented method of claim 1 wherein the determination of the interpolated pixel value is part of a first stage of interpolation, the method further comprising:
as part of a second stage of interpolation, determining a second interpolated pixel between at least some of the set of initial pixel values and the interpolated pixel value from the first stage; and
storing the second interpolated pixel value.

5. The computer-implemented method of claim 1 further comprising:
before the determination of the interpolated pixel value, selecting the auto-regressive edge-directed interpolation from among multiple available types of filtering, the multiple available types of filtering including another type of filtering that has lower computational complexity than the auto-regressive edge-directed interpolation but lower expected quality for filtering of textured content;
selecting the other type of filtering; and
determining a filtered pixel value in the low-resolution picture using the other type of filtering.

6. The computer-implemented method of claim 5 wherein the interpolated pixel value is in an interior region for which pixel values supplied to the auto-regressive edge-directed interpolation are within the low-resolution picture, and wherein the filtered pixel value is in a boundary region for which pixel values supplied to the auto-regressive edge-directed interpolation would be outside the low-resolution picture.

7. The computer implemented method of claim 5 wherein the selection of the auto-regressive edge-directed interpolation comprises:
determining that a local variance measure around the position of the interpolated pixel value satisfies a threshold variance.

8. The method of claim 1 wherein the computation of the auto-regressive coefficients that considers effects of applying the auto-regressive coefficients in projection from the interpolated pixel values includes:
determining the auto-regressive coefficients from the at least some of the initial pixel values of the low-resolution picture that are in the local window;
applying the auto-regressive coefficients to determine the interpolated pixel values;
projecting the interpolated pixel values back using related auto-regressive coefficients;
assessing the backward projection error between the back-projected pixel values and the corresponding ones of the initial pixel values of the local window; and
using the backward projection error to adjust the auto-regressive coefficients.

9. The method of claim 1 wherein the computing the auto-regressive coefficients includes one or more of:
adjusting size or shape of the local window depending on image characteristics of the low-resolution picture around the position of the interpolated pixel value;
differentially weighting the initial pixel values in the local window depending on which of the initial pixel values in the local window have neighboring pixel values like the set of initial pixel values;
differentially weighting the initial pixel values in the local window depending on proximity to the position of the interpolated pixel value; and
differentially weighting the initial pixel values in the local window based upon self-similarity of patches in the low-resolution picture.

10. A computer-readable storage medium storing computer-executable instructions that when executed by a processor cause a computing device to perform a method, wherein the computer-readable storage medium is selected from the group consisting of volatile memory, non-volatile memory, magnetic disk, CD-ROM, CD-RW and DVD, the method comprising:
copying pixel values from a first image at a lower resolution for a second image at a higher resolution; and
interpolating a pixel value between a set of the copied pixel values of a local window for the second image based on an auto-regressive edge-directed interpolation that incorporates a backward projection constraint, the backward projection constraint accounting for backward projection error for the copied pixel values of the local window around a position of the interpolated pixel value as a constraint on forward prediction for the interpolated pixel value, including:
computing auto-regressive coefficients from at least some of the copied pixel values that are in the local window around the position of the interpolated pixel value, wherein, for the backward projection constraint, the computing considers effects of applying the auto-regressive coefficients in projection from interpolated pixel values for the second image back to the copied pixel values of the local window for comparison of the back-projected pixel values to corresponding ones of the copied pixel values of the local window; and
applying the auto-regressive coefficients to the set of copied pixel values to determine the interpolated pixel value.

11. The computer-readable storage medium of claim 10 wherein the computation of the auto-regressive coefficients uses a closed-form solution that incorporates both the forward prediction and the backward projection constraint.

12. The computer-readable storage medium of claim 10 wherein the set of copied pixel values to which the auto-regressive coefficients are applied are the four pixel values diagonal from and adjacent to the position of the interpolated pixel value for the second image.

13. The computer-readable storage medium of claim 10 wherein the interpolation of the interpolated pixel value is part of a first stage of interpolation, the method further comprising:
as part of a second stage of interpolation, interpolating a second interpolated pixel value between at least some of the copied pixel values and the interpolated pixel value from the first stage.

14. The computer-readable storage medium of claim 13 wherein the interpolating the second interpolated pixel value uses second auto-regressive edge-directed interpolation that incorporates forward prediction without the backward projection constraint.

15. The computer-readable storage medium of claim 10, wherein the interpolated pixel value is in an interior region for which copied pixel values supplied to the auto-regressive edge-directed interpolation are available, the method further comprising:
determining a second interpolated pixel value in a boundary region using a second type of interpolation different than the auto-regressive edge-directed interpolation.

16. The computer-readable storage medium of claim 10, the method further comprising:

before the interpolation of the interpolated pixel value, determining that a local variance measure around the position of the interpolated pixel value satisfies a threshold variance, wherein the use of the auto-regressive edge-directed interpolation is contingent on the local variance measure satisfying the threshold variance.

17. The computer-readable storage medium of claim 10 wherein the computation of the auto-regressive coefficients that considers effects of applying the auto-regressive coefficients in projection from the interpolated pixel values includes:
 determining the auto-regressive coefficients from the at least some of the copied pixel values that are in the local window;
 applying the auto-regressive coefficients to determine the interpolated pixel values;
 projecting the interpolated pixel values back using related auto-regressive coefficients;
 assessing the backward projection error between the back-projected pixel values and the corresponding ones of the copied pixel values of the local window; and
 using the backward projection error to adjust the auto-regressive coefficients.

18. The computer-readable storage medium of claim 10 wherein the computing the auto-regressive coefficients includes one or more of:
 (a) adjusting size or shape of the local window depending on image characteristics around the position of the interpolated pixel value;
 (b) differentially weighting the copied pixel values in the local window depending on which of the copied pixel values in the local window have neighboring pixel values like the set of copied pixel values;
 (c) differentially weighting the copied pixel values in the local window depending on proximity to the position of the interpolated pixel value; and
 (d) differentially weighting the copied pixel values in the local window based upon self-similarity of patches in the first image.

19. A computing device comprising:
 at least one processor; and
 memory storing computer-executable instructions that when executed cause the computing device to perform a method comprising;
  copying pixel values from a first image at a lower resolution for a second image at a higher resolution; and
  interpolating a pixel value between a set of the copied pixel values of a local window for the second image based on an auto-regressive edge-directed interpolation that incorporates a backward projection constraint, the backward projection constraint accounting for backward projection error for the copied pixel values of the local window around a position of the interpolated pixel value as a constraint on forward prediction for the interpolated pixel value, including:
   computing auto-regressive coefficients from at least some of the copied pixel values that are in the local window around the position of the interpolated pixel value, wherein, for the backward projection constraint, the computing considers effects of applying the auto-regressive coefficients in projection from interpolated pixel values for the second image back to the copied pixel values of the local window for comparison of the back-projected pixel values to corresponding ones of the copied pixel values of the local window; and
   applying the auto-regressive coefficients to the set of copied pixel values to determine the interpolated pixel value.

20. The computing device of claim 19 wherein the set of copied pixel values to which the auto-regressive coefficients are applied are the four pixel values diagonal from and adjacent to the position of the interpolated pixel value for the second image.

21. The computing device of claim 19, wherein the interpolated pixel value is in an interior region for which copied pixel values supplied to the auto-regressive edge-directed interpolation are available, the method further comprising;
 determining a second interpolated pixel value in a boundary region using a second type of interpolation different than the auto-regressive edge-directed interpolation.

22. The computing device of claim 19, wherein the method further comprises:
 before the interpolation of the interpolated pixel value, determining that a local variance measure around the position of the interpolated pixel value satisfies a threshold variance, wherein the use of the auto-regressive edge-directed interpolation is contingent on the local variance measure satisfying the threshold variance.

23. The computing device of claim 19 wherein the computing the auto-regressive coefficients includes one or more of:
 (a) adjusting size or shape of the local window depending on image characteristics around the position of the interpolated pixel value;
 (b) differentially weighting the copied pixel values in the local window depending on which of the copied pixel values in the local window have neighboring pixel values like the set of copied pixel values;
 (c) differentially weighting the copied pixel values in the local window depending on proximity to the position of the interpolated pixel value; and
 (d) differentially weighting the copied pixel values in the local window based upon self-similarity of patches in the first image.

* * * * *